US012544498B2

(12) United States Patent
Nadolski et al.

(10) Patent No.: US 12,544,498 B2
(45) Date of Patent: Feb. 10, 2026

(54) TREATMENT APPARATUS WITH GAS SEPARATION DEVICE LEVEL CONTROLS AND METHODS

(71) Applicant: GAMBRO LUNDIA AB, Lund (SE)

(72) Inventors: Timothy Nadolski, Maple Grove, MN (US); Michael Wangen, Rogers, MN (US); Nickolas Penning, St. Paul, MN (US); Klaus Obergfell, Deephaven, MN (US)

(73) Assignee: GAMBRO LUNDIA AB, Lund (SE)

( * ) Notice: Subject to any disclaimer, the term of this patent is extended or adjusted under 35 U.S.C. 154(b) by 1278 days.

(21) Appl. No.: 17/055,268

(22) PCT Filed: May 9, 2019

(86) PCT No.: PCT/EP2019/061944
§ 371 (c)(1),
(2) Date: Nov. 13, 2020

(87) PCT Pub. No.: WO2019/219504
PCT Pub. Date: Nov. 21, 2019

(65) Prior Publication Data
US 2021/0196882 A1 Jul. 1, 2021

Related U.S. Application Data

(60) Provisional application No. 62/743,873, filed on Oct. 10, 2018, provisional application No. 62/672,718, filed on May 17, 2018.

(51) Int. Cl.
A61M 1/36 (2006.01)
(52) U.S. Cl.
CPC ....... A61M 1/3633 (2013.01); A61M 2205/07 (2013.01); A61M 2205/3331 (2013.01);
(Continued)

(58) Field of Classification Search
CPC ............ A61M 1/3633; A61M 2205/07; A61M 2205/3331; A61M 2205/3382;
(Continued)

(56) References Cited

U.S. PATENT DOCUMENTS 4,806,135 A * 2/1989 Siposs .................. B01D 36/001
96/219
4,909,780 A * 3/1990 Ouriel ................. A61M 1/3627
137/625.21

(Continued)

FOREIGN PATENT DOCUMENTS

EP 2185216 5/2010
WO WO 2016/006274 1/2016
(Continued)

OTHER PUBLICATIONS

PCT International Search Report and Written Opinion for PCT/EP2019/061944 dated Jul. 9, 2019 (8 pages).
(Continued)

Primary Examiner — Rebecca E Eisenberg
Assistant Examiner — Ted Yang
(74) Attorney, Agent, or Firm — Mueting Raasch Group

(57) ABSTRACT

Treatment apparatus with liquid level controls for gas separation devices used to separate gas bubbles from liquids are described herein along with methods of controlling the level of liquids in the gas separation devices. The gas separation devices may be used in liquid treatment apparatus to separate gas bubbles from one or more liquids such as, e.g., physiological liquids (e.g., blood, etc.).

18 Claims, 11 Drawing Sheets

(52) U.S. Cl.
CPC ............... *A61M 2205/3382* (2013.01); *A61M 2205/3386* (2013.01)

(58) Field of Classification Search
CPC ........ A61M 2205/3386; A61M 1/3627; A61M 1/36; A61M 1/1658; A61M 1/3638; A61M 1/3629; A61M 1/363; A61M 1/3632
See application file for complete search history.

(56) References Cited

U.S. PATENT DOCUMENTS

| | | | | |
|---|---|---|---|---|
| 5,092,836 | A * | 3/1992 | Polaschegg | A61M 1/165 604/6.11 |
| 5,167,921 | A * | 12/1992 | Gordon | B01D 19/0031 210/500.24 |
| 5,228,889 | A * | 7/1993 | Cortial | A61M 1/1658 96/194 |
| 5,382,227 | A * | 1/1995 | Riquier | A61M 1/303 604/6.11 |
| 5,707,431 | A * | 1/1998 | Verkaart | A61M 1/3627 55/482 |
| 5,817,007 | A * | 10/1998 | Fodgaard | A61B 5/14551 356/325 |
| 7,517,387 | B2 | 4/2009 | Chevallet | |
| 8,465,641 | B2 | 6/2013 | Maierhofer | |
| 10,004,451 | B1 * | 6/2018 | Proud | A61B 5/4806 |
| 2002/0110485 | A1 * | 8/2002 | Stringer | A61M 1/3627 604/6.14 |
| 2005/0247203 | A1 * | 11/2005 | Chevallet | A61M 1/3627 96/209 |
| 2007/0110612 | A1 * | 5/2007 | Ito | A61M 1/3667 604/6.11 |
| 2009/0230058 | A1 * | 9/2009 | Boris-Moeller | A61M 1/3626 422/47 |
| 2011/0029269 | A1 * | 2/2011 | Hayter | A61M 5/1723 702/104 |
| 2011/0218411 | A1 * | 9/2011 | Keenan | A61B 5/150229 422/72 |
| 2012/0232362 | A1 * | 9/2012 | Gable | A61B 5/14532 600/310 |
| 2012/0253257 | A1 * | 10/2012 | Tamari | A61M 1/3627 604/6.09 |
| 2012/0292237 | A1 * | 11/2012 | Heyes | B01D 61/30 210/101 |
| 2013/0237897 | A1 * | 9/2013 | Crnkovich | A61M 1/3627 137/198 |
| 2013/0317373 | A1 * | 11/2013 | Warren | A61B 5/02141 600/479 |
| 2014/0052044 | A1 * | 2/2014 | Crnkovich | A61M 1/362262 137/1 |
| 2014/0228803 | A1 * | 8/2014 | Kogan | A61M 5/44 604/506 |
| 2015/0314055 | A1 * | 11/2015 | Hogard | A61M 1/1656 210/232 |
| 2015/0374902 | A1 * | 12/2015 | Chambers | A61M 1/3672 73/168 |
| 2016/0199562 | A1 | 7/2016 | Parisotto | |
| 2016/0363570 | A1 * | 12/2016 | Blackley | A61M 15/0003 |
| 2016/0375185 | A1 * | 12/2016 | Meisberger | A61M 1/0259 250/341.7 |
| 2017/0326282 | A1 * | 11/2017 | Wilt | A61M 1/362265 |
| 2017/0361008 | A1 * | 12/2017 | Turner | A61M 1/3666 |
| 2018/0154061 | A1 * | 6/2018 | Turner | A61M 1/3624 |
| 2018/0289882 | A1 * | 10/2018 | Khair | G01N 33/49 |
| 2019/0175079 | A1 * | 6/2019 | Nishida | A61B 5/14532 |

FOREIGN PATENT DOCUMENTS

| | | |
|---|---|---|
| WO | WO 2017/001357 | 1/2017 |
| WO | WO 2017/001358 | 1/2017 |

OTHER PUBLICATIONS

Swedish Search Report for Application No. 1850661-8 dated Dec. 11, 2019 (3 pages).

* cited by examiner

TREATMENT APPARATUS WITH GAS SEPARATION DEVICE LEVEL CONTROLS AND METHODS

RELATED APPLICATIONS

This application is a U.S. National Stage Application of International Application No. PCT/EP2019/061944 filed May 9, 2019 and published in English on Nov. 21, 2019 as International Publication No. WO 2019/219504 A1, which claims the benefit under 35 U.S.C. Section 119 of U.S. Provisional Application Ser. No. 62/672,718, filed 17 May 2018 and of U.S. Provisional Application Ser. No. 62/743,873, filed 10 Oct. 2018, the disclosures of which are both incorporated herein by reference Treatment apparatus with level controls for gas separation devices used to separate gas bubbles from liquids are described herein along with methods of controlling the level of liquids in the gas separation devices. The gas separation devices may be used in liquid treatment apparatus to separate gas bubbles from one or more liquids such as, e.g., physiological liquids (e.g., blood, etc.).

Removal of gas bubbles present in a liquid may be beneficial. For example, gas bubbles present in a physiological liquid (for example, blood circulating in an extracorporeal circuit) should be removed when the liquid is to be administered to a patient.

Some extracorporeal blood treatment apparatus involve the simultaneous delivery to a patient of both a physiological liquid (for example, blood circulating in an extracorporeal circuit) and an additional liquid (for example, an infusion or replacement liquid). Before the liquids are delivered to the patient, however, gas bubbles that may be present in the liquids may preferably be removed.

Many gas separation devices include a chamber designed to be partially occupied by the liquid (for example, blood) which is to undergo the degassing operation. Suitable shaping of the chamber and orientation of the device allows the liquid to accumulate in a lower part of the chamber due to the force of gravity, thus promoting the separation of the lower density gas bubbles because they rise through the liquid. These bubbles can be removed from the chamber through a service line or discharged directly to the exterior.

In some instances, the pressure within the separation device may be kept below atmospheric pressure to promote the separation of the air bubbles.

Control over the level of the liquid in the chamber of the gas separation device is needed to provide an air space above the liquid into which the air bubbles leaving the liquid can pass. In some gas separation devices, level control may be achieved by controlling the gas pressure in the upper volume above the liquid in a gas separation device chamber. Delivery of gas (for example, air or any other suitable gas or combination of gases) into the upper volume can be used to move the liquid level in the chamber downward, while removing gas from the upper volume can be used to allow the level of the liquid upward. U.S. Pat. No. 7,517,387 (Chevallet et al.) describes one example of a gas separation device using these principles to control liquid level.

SUMMARY

Treatment apparatus with liquid level controls for gas separation devices used to separate gas bubbles from liquids are described herein along with methods of controlling the level of liquids in the gas separation devices. In one or more embodiments, the gas separation devices may be used to separate gas bubbles from physiological liquids, e.g., cellular liquids such as blood.

In embodiments in which the level of the liquid in a gas separation device is controlled by either delivering gas to or removing gas from the internal volume of the gas separation device. The gas (for example, air) may be delivered into or removed from the gas space in the internal volume of the gas separation chamber above the liquid. In some instance, removal of air from the internal volume may reduce the gas pressure above the liquid to a level below atmospheric pressure.

If the liquid in the gas separation device produces a foam above the liquid level and gas is being removed from the gas separation device to raise the liquid level in the gas separation device, the foam may be drawn into the outlet through which the gas bubbles are removed from the gas separation device and towards the components (for example, filters, pressure sensors, pumps, etc.) used to control the liquid level in the gas separation device. Contact between those components and the foam may require stoppage of the apparatus to allow for replacement and/or cleaning of the components contacted by the foam.

In one or more embodiments, the apparatus described herein may include a controller that disables a level control apparatus such that, upon detection of foam in an outlet of the gas separation device under conditions in which liquid is to be introduced into the gas separation device, the level control apparatus is disabled such that the foam is not drawn into contact with components that may need to be replaced and/or cleaned if contacted by foam.

Some sensors (such as, e.g., ultrasonic sensors) can accurately and repeatably detect the presence of liquids, but cannot accurately and repeatably detect foam (which includes primarily air or another gas or gasses). Foams may, however, be detected by other sensors such as, e.g., optical sensors. In particular, foams that contain blood may be particularly detectable using infrared (IR) optical detection apparatus because the absorption of light in the infrared spectrum between 800 and 900 nm is strongly influenced by the presence of hemoglobin as discussed in in, e.g., U.S. Pat. No. 6,947,131 (O'Mahony et al.).

Similarly, although optical sensors may be used to detect liquids, optical sensors may not be particularly accurate in detecting the level of liquids in a gas separation device. Liquid level detectors such as, e.g., ultrasonic sensors, capacitive sensors are, however, particularly effective at detecting liquid levels in a variety of circumstances.

Any liquid level sensor that emits energy and then detects that emitted energy (e.g., ultrasonic sensors, optical sensors, etc.) may have difficulty accurately detecting liquid in a volume that includes a body in a volume in which liquid is to be detected such as, e.g., the guide elements found in the gas separation devices described in U.S. Pat. No. 7,517,387 (Chevallet et al.). In one or more embodiments of the apparatus described herein, an ultrasonic level sensor may have a detection axis that does not pass through the guide element so that accuracy of the liquid level detection in gas separation devices that include guide elements or other bodies is improved.

A combination of a level control protection sensor and one or more liquid level sensors in in one or more embodiments of apparatus as described herein may be used to control the level of a liquid from which gas bubbles are to be removed while detecting foam using a level control protection sensor using a sensing modality that is effective to detect foam and/or liquid, so that the level of a liquid from which gas bubbles are to be removed can be effectively controlled in a gas separation device used in an apparatus as described herein.

In a first aspect, one or more embodiments of a liquid treatment apparatus described herein may include: a pump located on a housing, wherein pump is configured to move liquid, optionally blood or another physiological liquid during extracorporeal blood treatment; and a gas separation device positioned on the housing, wherein the pump is configured to deliver liquid to the gas separation device. The gas separation device comprises: a containing body defining an internal volume, a first outlet in fluid communication with the internal volume, wherein the first outlet is located proximate a bottom of the containing body, a first inlet in fluid communication with the internal volume, the first inlet located above and spaced apart from the first inlet, and a second outlet in fluid communication with the internal volume, wherein the first inlet is located between the first outlet and the second outlet. The liquid treatment apparatus also includes a lower liquid level sensor configured and positioned to detect liquid at a selected lower liquid level in the internal volume; and a level control apparatus in fluid communication with the internal volume of the gas separation device, the level control apparatus configured to deliver gas to or remove gas from the internal volume through an opening located above the first inlet. A controller is operably connected to the lower liquid level sensor and the level control apparatus, the controller configured to: receive signals from the lower liquid level sensor indicating that liquid is present or not present at the lower liquid level in the internal volume, activate the level control apparatus to deliver gas to the internal volume to lower the liquid level below the lower liquid level, activate the level control apparatus to remove a selected volume of gas from the internal volume when the signals from the lower liquid level sensor indicate that liquid is not present at the lower liquid level, and wait a selected period of time after removing the selected volume of gas from the internal volume before activating the level control apparatus to deliver gas to the internal volume to lower the liquid level below the lower liquid level.

In one or more embodiments of the first aspect, the lower liquid level sensor is selected from the group of an ultrasonic liquid sensor and a capacitive liquid sensor.

In a second aspect, one or more embodiments of a liquid treatment apparatus described herein include: a pump located on a housing, the pump configured to move liquid during extracorporeal blood treatment; and a gas separation device positioned on the housing, wherein the pump is configured to deliver liquid to the gas separation device. The gas separation device comprises: a containing body defining an internal volume, a first outlet in fluid communication with the internal volume, wherein the first outlet is located proximate a bottom of the containing body, a first inlet in fluid communication with the internal volume, the first inlet located above and spaced apart from the first inlet, and a second outlet in fluid communication with the internal volume, wherein the first inlet is located between the first outlet and the second outlet. The liquid treatment apparatus also includes an upper liquid level sensor configured and positioned to detect liquid at a selected upper liquid level in the internal volume; and a level control apparatus in fluid communication with the internal volume of the gas separation device, the level control apparatus configured to deliver gas to or remove gas from the internal volume through an opening located above the first inlet. A controller is operably connected to the upper liquid level sensor and the level control apparatus, the controller configured to: receive signals from the upper liquid level sensor indicating that liquid is present or not present at the upper liquid level in the internal volume, activate the level control apparatus to remove gas from the internal volume to raise the liquid level to the upper liquid level, activate the level control apparatus to deliver a selected volume of gas into the internal volume when the signals from the upper liquid level sensor indicate that liquid is present at the upper liquid level, and wait a selected period of time after delivering the selected volume of gas into the internal volume before activating the level control apparatus to remove gas from the internal volume to raise the liquid level to the upper liquid level.

In one or more embodiments of the second aspect, the upper liquid level sensor is selected from the group of an ultrasonic liquid sensor and a capacitive liquid sensor.

In one or more embodiments of the first and second aspects, the apparatus further comprises a level control protection sensor configured to detect foam and/or liquid leaving the internal volume through the second outlet, wherein the controller is operably connected to the level control protection sensor, the controller further configured to receive signals from the level control protection sensor indicating that foam and/or liquid is present or not present in the second outlet of the degassing device and disable the level control apparatus when the signals from the level control protection sensor indicate that foam and/or liquid is present in the second outlet.

In one or more embodiments of the first and second aspects including a level control protection sensor, the level control protection sensor is configured to detect one or more of foam, non-blood liquid, and blood leaving the internal volume through the second outlet, and wherein the controller is configured to: receive a signal from the level control protection sensor; and determine whether one of foam, non-blood liquid, and blood is present or not present at the level control protection sensor based on the received signal from the level control protection sensor.

In one or more embodiments of the first and second aspects including a level control protection sensor, the controller is further configured to normalize the level control protection sensor by determining a normalization value when foam, non-blood liquid, and blood are not present in the second outlet. In one or more embodiments, normalizing the level control protection sensor when foam, non-blood liquid, and blood are not present in the internal volume comprises adjusting one or more parameters of the level control protection sensor until the signal reaches the normalization value.

In one or more embodiments of the first and second aspects including a level control protection sensor, the level control protection sensor comprises: a photodetector to provide the signal of the level control protection sensor; and an optical energy source positioned to direct optical energy at the photodetector. In one or more embodiments, the optical energy source emits optical energy in the IR spectrum and the photodetector detects optical energy in the IR spectrum.

In one or more embodiments of the first and second aspects including a level control protection sensor, determining whether one of foam, non-blood liquid, and blood is present or not present in the internal volume based on the received signal from the level control protection sensor comprises: determining that foam is present if the received signal is less than or equal to a foam threshold value and greater than a blood threshold value.

In one or more embodiments of the first and second aspects including a level control protection sensor, determining whether one of foam, non-blood liquid, and blood is present or not present in the internal volume based on the received signal from the level control protection sensor comprises: determining that non-blood liquid is present if the received signal is greater than or equal to a non-blood liquid threshold value.

In one or more embodiments of the first and second aspects including a level control protection sensor, determining whether one of foam, non-blood liquid, and blood is present or not present in the internal volume based on the received signal from the level control protection sensor comprises: determining that blood is present if the received signal is less than or equal to a blood threshold value.

In one or more embodiments of the first and second aspects including a level control protection sensor, determining whether one of foam, non-blood liquid, and blood is present or not present in the internal volume based on the received signal from the level control protection sensor comprises: determining that none of non-blood liquid, and blood is present if the received signal is greater than or equal to a foam threshold value and less than a non-blood liquid threshold value.

In one or more embodiments of the first and second aspects including a level control protection sensor, the foam threshold value, the non-blood liquid threshold value, and the blood threshold value are each a different selected percentage of the normalization value.

In a third aspect, one or more embodiments of a liquid treatment apparatus described herein includes: a pump configured to move liquid, optionally blood or another physiological liquid, during extracorporeal blood treatment and a gas separation device, wherein the pump is configured to deliver liquid to the gas separation device. The gas separation device comprises: a containing body defining an internal volume, a first outlet in fluid communication with the internal volume, wherein the first outlet is located proximate a bottom of the containing body, a first inlet in fluid communication with the internal volume, the first inlet located above and spaced apart from the first inlet, and a second outlet in fluid communication with the internal volume, wherein the first inlet is located between the first outlet and the second outlet. The liquid treatment apparatus also includes a level control protection sensor to detect one or more of foam, non-blood liquid, and blood leaving the internal volume through the second outlet; and a controller operably connected to the level control protection sensor. The controller is configured to: receive a signal from the level control protection sensor; and determine whether one of foam, non-blood liquid, and blood is present or not present in a selected volume of the second outlet of the gas separation device based on the received signal from the level control protection sensor.

In a fourth aspect, one or more embodiments of a sensor apparatus as described herein includes: a level control protection sensor configured to detect one or more of foam, non-blood liquid, and blood within a selected internal volume; and a controller operably connected to the level control protection sensor and configured to: receive a signal from the level control protection sensor; and determine whether one of foam, non-blood liquid, and blood is present or not present in the selected volume based on the received signal from the level control protection sensor.

In one or more embodiments of the third and fourth aspects, the controller is further configured to normalize the level control protection sensor by determining a normalization value when foam, non-blood liquid, and blood are not present in the second outlet. In one or more embodiments, normalizing the level control protection sensor when foam, non-blood liquid, and blood are not present in the selected volume comprises adjusting one or more parameters of the level control protection sensor until the signal reaches the normalization value.

In one or more embodiments of the third and fourth aspects, the level control protection sensor comprises: a photodetector to provide the signal of the level control protection sensor; and an optical energy source positioned to direct optical energy at the photodetector. In one or more embodiments, the optical energy source emits optical energy in the IR spectrum and the photodetector detects optical energy in the IR spectrum.

In one or more embodiments of the third and fourth aspects, determining whether one of foam, non-blood liquid, and blood is present or not present in the selected volume based on the received signal from the level control protection sensor comprises: determining that foam is present if the received signal is less than or equal to a foam threshold value and greater than a blood threshold value.

In one or more embodiments of the third and fourth aspects, determining whether one of foam, non-blood liquid, and blood is present or not present in the selected volume based on the received signal from the level control protection sensor comprises: determining that non-blood liquid is present if the received signal is greater than or equal to a non-blood liquid threshold value.

In one or more embodiments of the third and fourth aspects, determining whether one of foam, non-blood liquid, and blood is present or not present in the selected volume based on the received signal from the level control protection sensor comprises: determining that blood is present if the received signal is less than or equal to a blood threshold value.

In one or more embodiments of the third and fourth aspects, determining whether one of foam, non-blood liquid, and blood is present or not present in the selected volume based on the received signal from the level control protection sensor comprises: determining that none of non-blood liquid, and blood is present if the received signal is greater than or equal to a foam threshold value and less than a non-blood liquid threshold value.

In one or more embodiments of the third and fourth aspects, the foam threshold value, the non-blood liquid threshold value, and the blood threshold value are each a different selected percentage of the normalization value.

In a fifth aspect, methods of controlling liquid level in a gas separation device of a liquid treatment apparatus are described herein.

Although described in connection with extracorporeal blood treatment apparatus, such as, e.g., dialysis machines, etc., in which at least one gas separation device typically operates in a line for the return of blood to the patient, extracorporeal blood treatment apparatus are only one exemplary type of liquid treatment apparatus with which the present invention may be used.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other when gas separation devices are properly installed on an apparatus as described herein (e.g., an extracorporeal blood treatment apparatus).

The above summary is not intended to describe each embodiment or every implementation of the apparatus including a gas separation device and methods of using the same described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
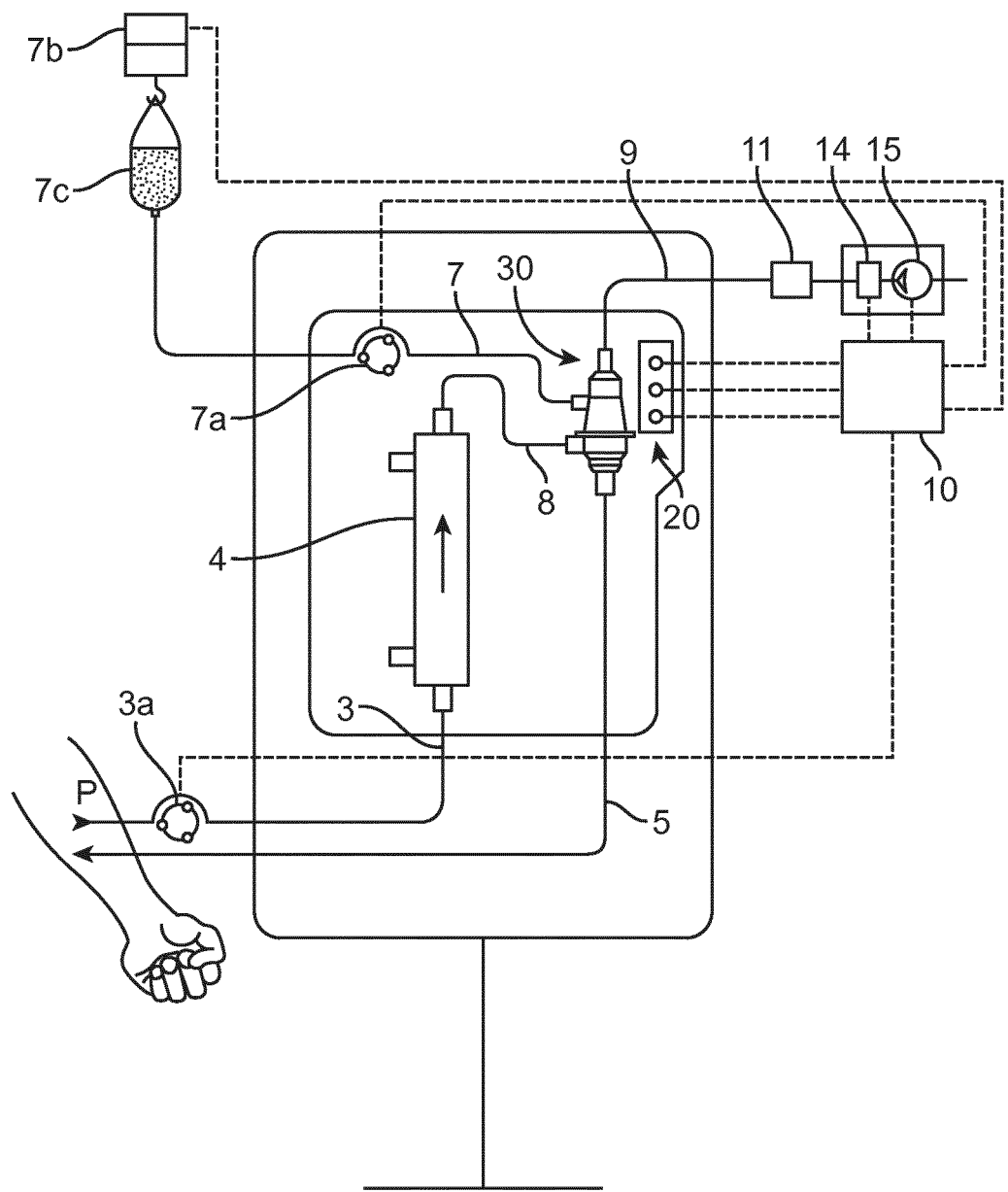
FIG. 1 is a schematic diagram of one illustrative embodiment of an apparatus in which one illustrative embodiment of a gas separation device and level control system may be used.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

FIG. 1 is a schematic diagram of one illustrative embodiment of an apparatus in which one illustrative embodiment of a gas separation device 30 and liquid level/foam detection system 20 may be used. The apparatus depicted in FIG. 1 is in the form of one illustrative embodiment of an extracorporeal blood treatment apparatus, although the gas separation devices and liquid level/foam detection systems described herein may be used in many different fluid handling apparatus.

With reference to FIG. 1, however, the depicted illustrative embodiment of an extracorporeal blood treatment apparatus includes a blood pump 3a used to deliver blood from a patient P to a processing unit 4 (e.g., a dialysis filter, etc.), with the blood being delivered to the gas separation device 30 through line 8. The depicted extracorporeal blood treatment apparatus also includes a pump 7a used to deliver an optional infusion fluid from an infusion fluid source 7c into the gas separation device 30 through line 7. Control over delivery of the infusion fluid may, in one or more embodiments, be obtained using a weight scale 7b that may be operably connected to a controller 10 for the depicted apparatus.

In one or more embodiments in which the gas separation device 30 is used in an extracorporeal blood treatment apparatus, blood (which may include a portion of the infusion fluid delivered through line 7) may be returned to the patient through return line 5.

Figure 2:
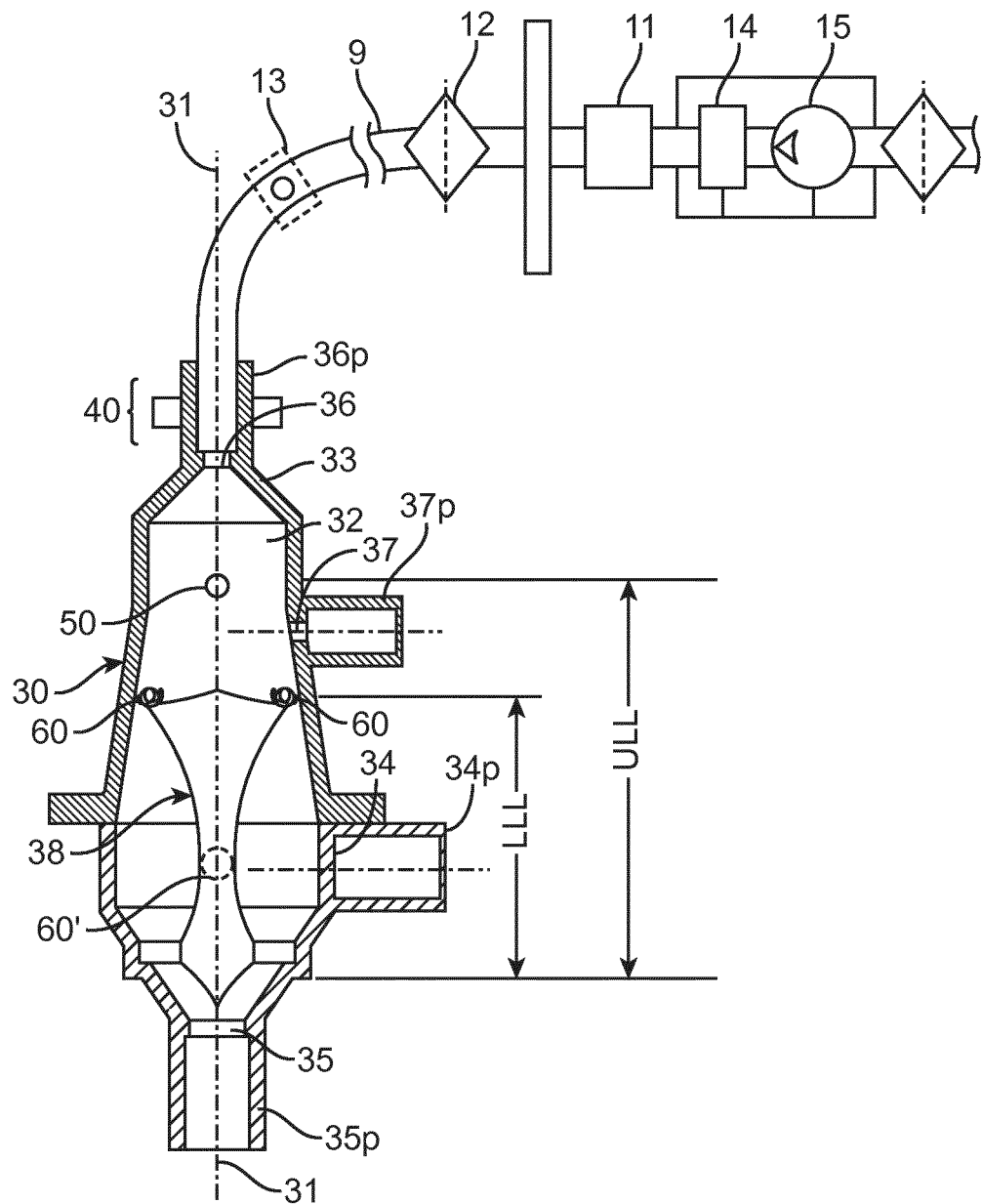
FIG. 2 is an enlarged cross-sectional view of the gas separation device of FIG. 1 taken along the longitudinal axis of the gas separation device.

The gas separation device 30 is depicted in more detail in FIG. 2, where one illustrative embodiment of the gas separation device 30 includes a containing body 33 having a longitudinal axis 31. The body 33 forms an internal volume 32 which is designed to receive a specified quantity of liquid from which gas bubbles are to be removed.

In operating conditions, both the gas separation device 30 and the processing unit 4 may be positioned with their longitudinal axes orientated vertically, although the gas separation device can, in some embodiments, operate with its longitudinal axis inclined relative to a perfectly vertical axis.

The liquid (for example, blood or another physiological liquid) flowing through the line 3 passes through the processing unit 4 with a vertical upward motion and then enters the device 30 for removal of gas bubbles located in the liquid. After passing through the gas separation device 30, the liquid, e.g., blood, may be returned to the patient.

In one or more embodiments, the containing body 33 includes a first inlet 34 through which liquid from which gas bubbles are to be removed is delivered into the internal volume 32 (through, e.g., line 8 in FIG. 1). The containing body 33 also includes a first outlet or discharge aperture 35 through which liquid located in the bottom of the internal volume 32 passes out or is removed from the gas separation device 30 (through, e.g., line 5 in FIG. 1). The containing body 33 of gas separation device also includes a second outlet 36 located at or near the top of the internal volume 32 through which gas can be removed from or delivered into the internal volume 32 (through, e.g., line 9 in FIG. 1). The pressure within the internal volume 32 may, in one or more embodiments, be measured using pressure sensors in fluid communication with outlet 36 and/or may be vented directly to the external atmosphere.

In one or more embodiments, the gas separation device 30 may include a second inlet 37 that may be used to, e.g., deliver a liquid and/or gas into the internal volume 32. In, for example, an extracorporeal blood treatment apparatus, the second inlet 37 may be used to deliver an infusion fluid into the internal volume 32 of the containing body 33 as described in, e.g., U.S. Pat. No. 7,517,387 (Chevallet et al.). In such embodiments, the infusion fluid may be useful to limit or prevent contact between air and a physiological fluid entering the gas separation device 30 through the first inlet 34.

In one or more embodiments, the first outlet 35 may be located within a first outlet port 35p, the second outlet 36 may be located within a second outlet port 36p, and the first inlet 34 may be located within a first inlet port 34p, with the ports being configured for attachment to tubing or other fluid lines used to deliver and/or remove fluids from the internal volume 32 of the containing body 33 of the gas separation device 30. In one or more embodiments, the first inlet 34 may be described as being located between the first outlet 35 and the second outlet 36 when moving between the first outlet 35 and the second outlet 36.

In one or more embodiments of a gas separation device as described herein, a guide element 38 may be located within the internal volume 32 of the containing body 33. In one or more embodiments, the guide element 38 may be located and configured such that liquid entering the internal volume through the first inlet 34 contacts an intermediate portion of the guide element 38. In one or more embodiments, the guide element 38 may extend between a top end and a bottom end, wherein the top end of the guide element 38 is located distal from the first outlet 35 and the bottom end of the guide element 38 is located distal from the second outlet 36. Examples of potentially suitable guide elements that may be useful when removing gas bubbles from physiological liquid, such as, e.g., blood, may be described in, e.g., U.S. Pat. No. 7,517,387 (Chevallet et al.). In one or more embodiments, the guide element 38 is in the form of a solid body located within the internal volume 32 of the containing body 33 and is configured to improve flow through the gas separation device while reducing the volume of blood contained within the internal volume 32.

In one or more embodiments of an apparatus described herein such as, e.g., an extracorporeal blood treatment apparatus, the liquid level within a gas separation device used in the apparatus may be controlled using a sensor array including a combination of one or more liquid level sensors and a level control protection sensor. With reference to FIG. 1, the depicted apparatus may include, for example, a sensor array 20 positioned proximate the gas separation device when the gas separation device is, for example, positioned on an exterior of a housing of an apparatus such as, e.g., an extracorporeal blood treatment apparatus.

Figure 3:
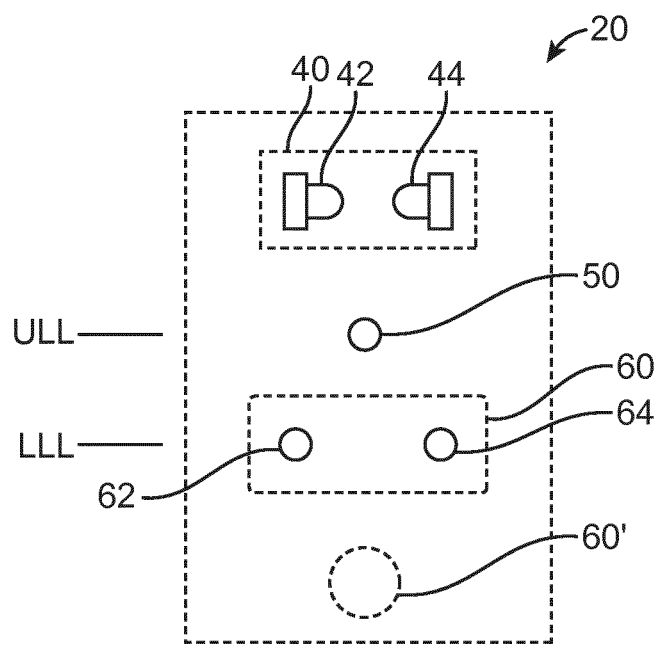
FIG. 3 is a schematic diagram of one illustrative embodiment of a sensor array that may be used in one or more embodiments of a level control system as described herein.

With reference to, e.g., FIGS. 2-3 (where FIG. 3 depicts the sensor array 20 in isolation from the gas separation device 30), where the sensor array is depicted in combination with the illustrative embodiment of a gas separation device 30, the sensor array 20 includes a level control protection sensor 40 positioned proximate the second outlet 36 of the gas separation device 30, an upper liquid level sensor 50, and lower level sensor 60.

The lower liquid level sensor 60 is configured and positioned to detect liquid at a selected lower liquid level (LLL) in the internal volume 32 of the gas separation device 30. In one or more alternative embodiments, the selected lower liquid level (LLL) may be at a location closer to the first outlet 35 of the gas separation device 30 than the LLL depicted in FIG. 2. In one or more embodiments, the lower liquid level sensor (and resulting lower liquid level (LLL)) may preferably be located at or above the first inlet 34. One illustrative embodiment for an alternative lower liquid level sensor position is seen in connection with lower liquid level sensor 60' depicted (in broken lines) in both FIGS. 2 and 3 at approximately the height of the first inlet 34. In such an embodiment, the lower liquid level (LLL) would be located at the height of the lower liquid level sensor 60'.

The level control protection sensor 40 is configured and positioned to detect foam and/or liquid leaving the internal volume 32 of the gas separation device 30 through the second outlet 36.

The upper liquid level sensor 50 is configured and positioned to detect liquid at a selected upper liquid level (ULL) in the internal volume 32 of the gas separation device 30. In one or more embodiments, the upper liquid level sensor 50 may be described as being positioned between the lower liquid level sensor 60 and the level control protection sensor 40 when moving from the first outlet 35 to the second outlet 36 of the gas separation device 30.

In one or more embodiments, the level control protection sensor 40 may be in the form of an optical sensor, while the lower liquid level sensor 60 may be an ultrasonic liquid sensor and/or a capacitive liquid sensor. In embodiments in which the lower liquid level sensor 60 is in the form of an ultrasonic liquid sensor, the ultrasonic liquid sensor may be configured to direct ultrasonic energy into the internal volume 32 of the gas separation device 30 to detect the presence of liquid at that location (e.g., the lower liquid level LLL)) within the internal volume 32.

Figure 5:
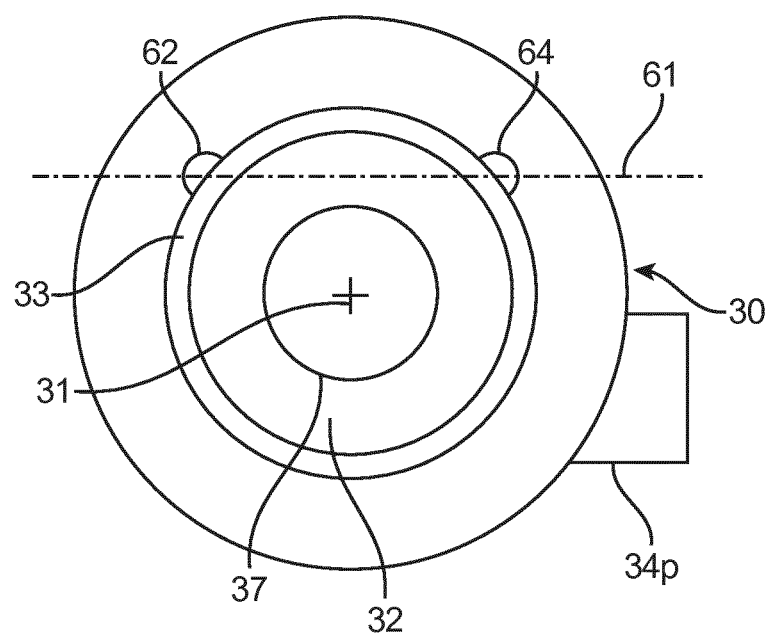
FIG. 5 is a cross-sectional view depicting illustrative embodiments of a gas separation device and a cross-chamber arrangement of liquid sensors that may be used in one or more embodiments of level control systems as described herein.

In one or more embodiments, the lower liquid level sensor 60 may include a separate emitter 62 and a receiver 64 as depicted in FIG. 3. In one or more embodiments, the emitter 62 and receiver 64 may be spaced apart from each other along, e.g., a detection axis. FIG. 5, along with FIG. 3, are schematic representations of a lower liquid level sensor 60 including a separate emitter 62 and receiver 64 spaced apart from each other along a detection axis 61.

In particular, FIG. 5 is a cross-sectional view of the gas separation device 30 including containing body 33 internal volume 32 and first inlet port 34p, with the cross-sectional view being taken transverse to the longitudinal axis 31 extending through the gas separation device 30. As seen in FIG. 5, the emitter 62 and receiver 64 of lower liquid level sensor 60 are positioned along detection axis 61 such that the detection axis 61 does not pass through the guide element 38 also located within the internal volume 32 of gas separation device 30. In one or more embodiments, the detection axis 61 passing through the internal volume 32 may be described as passing through the internal volume between the guide element 38 and the inner surface containing body 33.

Positioning the lower liquid level sensor 60 such that the detection axis 61 does not pass through the guide element 38, limits or prevents the guide element 38 from interfering with accurate detection of liquid in the internal volume 32 of the gas separation device 30.

The upper liquid level sensor 50 may, in one or more embodiments, be an ultrasonic liquid sensor and/or a capacitive liquid sensor. In embodiments in which the upper liquid level sensor 50 is in the form of an ultrasonic liquid sensor, the ultrasonic liquid sensor may be configured to direct ultrasonic energy into the internal volume 32 of the gas separation device 30 to detect the presence of liquid at that location (e.g., the upper liquid level (ULL)) within the internal volume 32.

The level control protection sensor 40 used in one or more embodiments of the apparatus including a gas separation device as described herein, may be in the form of an optical sensor that is capable of detecting both foam and liquid. In such embodiments, the optical sensor may include an optical energy source 42 positioned to direct optical energy at a photo detector 44 (see, e.g., FIG. 3), with the optical energy passing through fluids (that is, liquids, foams, and/or gasses)

passing through the second outlet 36 of the gas separation device 30. In one or more embodiments, the optical energy source 42 may be positioned to direct optical energy through the second outlet port 36*p* towards the photo detector 44.

In one or more embodiments, a controller (see, e.g., controller 10 and its corresponding description herein) may be configured to drive the optical energy source 42 in a pulsed mode with the photo detector 44 using the pulsed optical energy to determine when the optical energy emitted by the optical energy source 42 should be expected at the photo detector 44. When the optical energy is not expected (that is, the optical energy source 42 is not emitting optical energy) any optical energy detected by the photo detector 44 may be used to account for the presence of ambient light incident on the photo detector 44 to limit erroneous signals from the level control protection sensor 40.

As discussed herein, one or more embodiments of the level control protection sensors used herein may use optical energy in the IR spectrum such that the optical energy source 42 emits energy in the IR spectrum and the photo detector is configured to detect optical energy in the IR spectrum. Level control protection sensors relying on optical energy in the IR spectrum may be particularly useful in detecting the presence of foam that contains blood or other substances that preferentially absorb optical energy in the IR spectrum. The sensor may also be capable of detecting the presence of blood, as well as liquids that may or may not contain trace amounts of blood (such as, for example, saline, replacement fluid, saline containing some blood, replacement fluid containing some blood, etc.).

One or more embodiments of an apparatus including a gas separation device as described herein may include a level control apparatus in fluid communication with the internal volume 32 of the gas separation device 30. The level control apparatus may be configured to deliver gas to or remove gas from the internal volume, with the delivery of gas to or removal of gas from the internal volume being used to control pressure within the internal volume, with changing pressure being used to control the level of the liquid within the internal volume 32 of the gas separation device 30. In one or more embodiments, the gas delivered to or removed from the internal volume 32 of the gas separation device 30 may be delivered to or removed from the internal volume 32 through an opening located above the first inlet 34 (through which the liquid being processed is delivered into the internal volume 32 of the gas separation device 30). Still further, in one or more embodiments, the gas delivered to or removed from the internal volume 32 of the gas separation device 30 may pass through the second outlet 36.

With reference to FIGS. 1-2, one illustrative embodiment of a level control apparatus that may be used in connection with a gas separation device used in an apparatus as described herein may include a pressure sensor 11, solenoid valve 14 and pump 15 connected to the second outlet 36 of the gas separation device 30. The valve 14 and pump 15 may be used to deliver and/or remove gas from the internal volume 32 of the gas separation device 30 based on control signals from a controller 10 that is operably connected to the valve 14/pump 15 of the level control apparatus, as well as being operably connected to the level control protection sensor 40, upper liquid level sensor 50, and lower liquid level sensor 60. The use of a valve 14/pump 15 as a liquid level control apparatus is described in, e.g., U.S. Pat. No. 7,517,387 (Chevallet et al.).

The depicted embodiment of gas separation device 30 also includes a port 13 along line 9 leading from the second outlet 36 with the port 13 being provided to allow for manual removal from or delivery of gas to the internal volume 32 of the gas separation device 30.

Also depicted is a barrier 12 which may be in the form of, e.g., a hydrophobic membrane. The barrier 12 may allow passage of gases, while limiting the passage of liquid and, as such, may be used to protect components such as pressure sensor 11, solenoid valve 14 and air pump 15 from contact with blood or other materials which may be drawn into line 9 in the event of a failure of the level control and/or foam detection systems as described herein.

With reference to FIG. 1, the apparatus to which gas separation device 30 is connected as discussed herein may include a controller 10 that is operably connected to each of the sensors in the sensor array 20. More particularly, the controller 10 may be operably connected to each of the level control protection sensor 40, upper liquid level sensor 50, and lower liquid level sensor 60 (as well as to any suitable components in a level control apparatus that may be provided in one or more embodiments of an apparatus as described herein).

In one or more embodiments, the level control protection sensors used in connection with a gas separation device 30 as described herein may be configured to emit signals indicating that foam and/or liquid is either present or not present, while the upper and/or lower liquid level sensors are configured to emit signals indicating that liquid is present or not present at the respective sensor. The controller 10 is operably connected to each of the various sensors such that signals emitted by the sensors can be received by the controller 10 and used to perform various functions as described herein.

In one or more embodiments, the controller may be configured to, for example, receive signals from the lower liquid level sensor 60 indicating that liquid is present or not present at the lower liquid level (LLL) in the internal volume 32, receive signals from the upper liquid level sensor indicating that liquid is present or not present at the upper liquid level (ULL) in the internal volume 32, and activate the level control apparatus to remove gas from the internal volume 32 of the gas separation device 30 when the signals from the lower liquid level sensor 60 indicate that liquid is not present at the lower liquid level and the signals from the level control protection sensor 40 indicate that foam and or liquid is not present in the second outlet 36 of the gas separation device 30. In one or more embodiments, the controller 10 may also be configured to disable the level control apparatus when signals from the level control protection sensor 40 indicate that foam and/or liquid is present in the second outlet 36 so that blood or other liquids are not drawn further towards the components of the level control apparatus (such as, e.g., barrier 12, pressure sensor 11, valve 14, and/or pump 15).

In one or more alternative apparatus, the controller 10 may be configured to receive signals from the lower liquid level sensor 60 indicating that liquid is present or not present at the lower liquid level (LLL) in the internal volume 32 of the gas separation device 30, receive signals from the upper liquid level sensor 50 indicating that liquid is present or not present at the upper liquid level (ULL) in the internal volume 32 of the gas separation device 30, receive signals from the level control protection sensor 40 indicating that foam and/or liquid is present or not present in the second outlet of the gas separation device 30, and confirm that foam and/or liquid is present in the second outlet when the signals from the level control protection sensor 40 indicate that foam and/or liquid is present in the second outlet and the signals from the upper liquid level sensor 60 indicate that liquid is not present at the upper liquid level (ULL).

Operation of one or more embodiments of a gas separation device to control the liquid level within the internal volume of the device, as well as to limit the removal of foam and/or liquid from the internal volume of the gas separation device may be described in connection with the flowchart depicted in FIG. 4.

Figure 4:
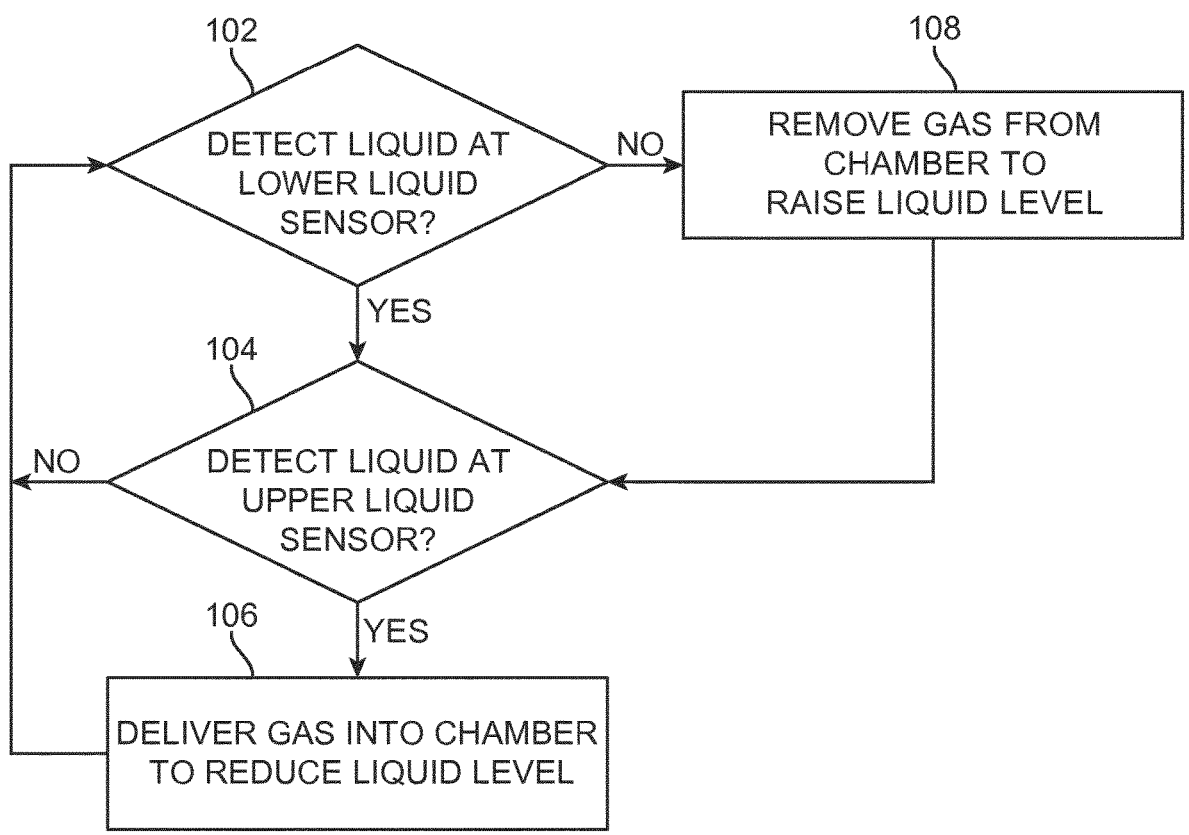
FIG. 4 is a flowchart illustrating operation of a one illustrative embodiment of a level control system as described herein.

With reference to FIG. 4, operation of the apparatus may include detecting liquid at a lower liquid sensor (102). If liquid is not detected at the lower liquid level sensor, gas may be removed from the chamber/internal volume of the gas separation device to raise the liquid level within the chamber/internal volume (108). In one or more embodiments, gas is removed from the chamber/internal volume until liquid is detected at the upper liquid sensor. Alternatively, a selected volume of gas may be removed from the chamber/internal volume when liquid is not detected at the lower liquid sensor.

If liquid is detected at the lower liquid level sensor (102), then a determination is made as to whether the upper liquid level sensor detects liquid (104). If liquid is not detected at the upper liquid level sensor (104), the system/method continues to monitor the lower liquid level sensor (102). If, alternatively, liquid is detected at the upper liquid level sensor (104), then gas may be delivered into the chamber/internal volume of the gas separation device to lower or reduce the liquid level within the chamber/internal volume of the gas separation device (106).

After delivering gas into the chamber/internal volume of the gas separation device to lower or reduce the liquid level within the chamber/internal volume (106), the apparatus may return to detect whether liquid is present or detected by the lower liquid sensor (102).

In one or more embodiments, automated operation of the level control system as, e.g., illustrated in the flow chart of FIG. 4, may be disabled whenever the level control protection sensor (e.g., level control protection sensor 40) detects the presence of foam and/or liquid and/or an alert may be provided to an operator regarding the detection of foam and/or liquid by the level control protection sensor. Disabling the liquid level control system may limit the likelihood or prevent the system from drawing foam or liquid towards the liquid level control system components during removal of gas from the chamber (106) if the gas is removed from the second outlet at which the foam detector is positioned.

In one or more alternative embodiments of a level control apparatus that may be used in connection with a gas separation device used in a treatment apparatus as described herein the level control system may operate using only an upper level liquid sensor. One illustrative embodiment of operation of a level control apparatus relying only on an upper level liquid sensor will be described in connection with the upper level sensor 50 depicted and described in connection with the gas separation device 30 seen in FIGS. 1-3 and the flowchart of FIG. 6.

Figure 6:
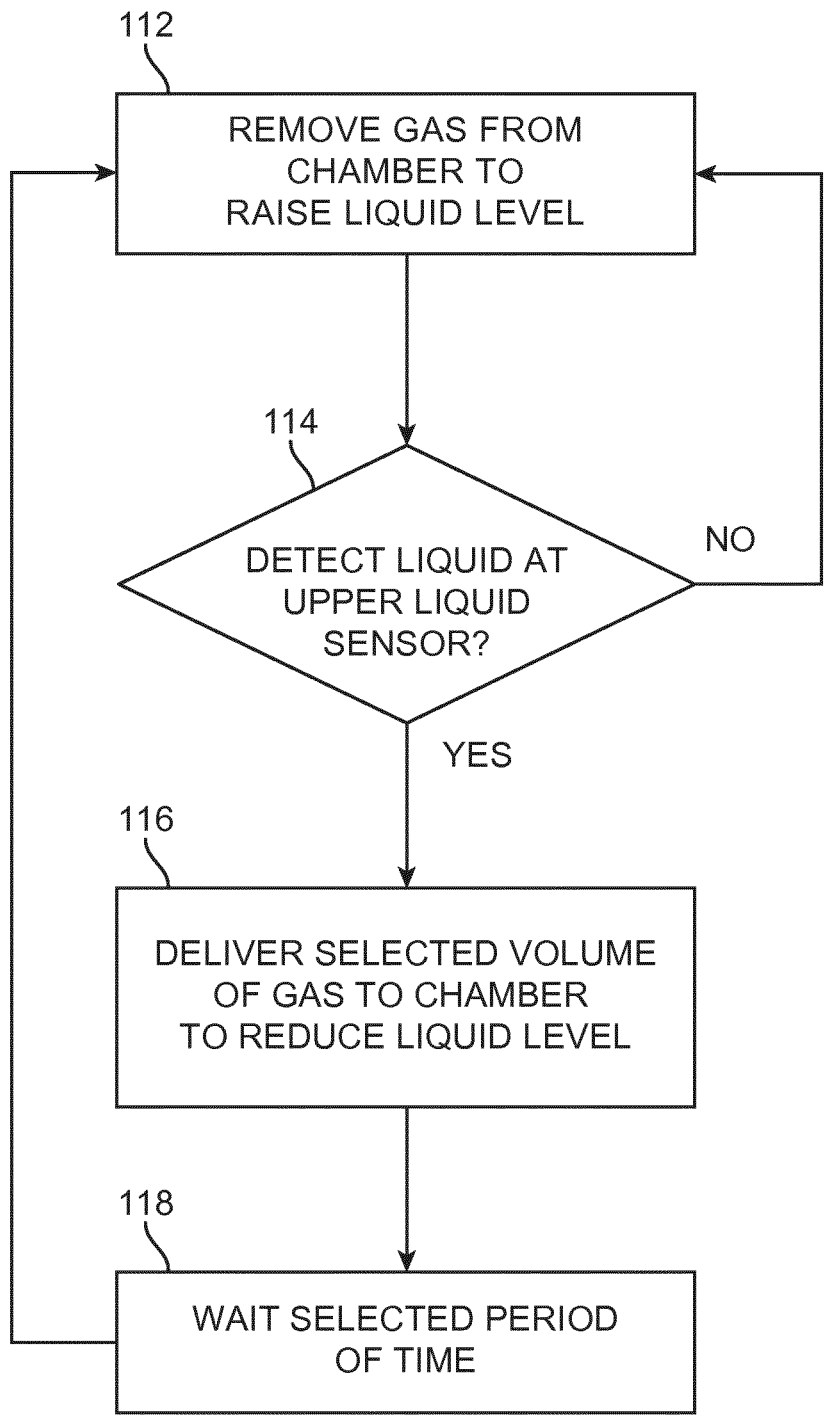
FIG. 6 is a flowchart illustrating operation of another illustrative embodiment of a level control system as described herein.

In a level control apparatus that relies on only an upper level liquid sensor, the control over liquid level within a gas separation device such as, e.g., gas separation device 30 may be controlled as described in the flowchart of FIG. 6. In such a system/method, gas may be removed from the chamber to raise the level of liquid in the chamber (112), with the system checking to determine if liquid is detected at the upper liquid level sensor (114).

Upon detection of liquid at the upper liquid sensor (114) the level control system may be configured to deliver a selected volume of gas to the chamber to reduce the level of liquid therein (116). In one or more embodiments, the selected volume of gas delivered to the chamber may be selected to move the level of liquid in the chamber to a selected level relative to the upper liquid level (ULL). That selected level may, in one or more embodiments, correspond to or be near the lower liquid level (LLL), but other volumes of gas may also be delivered. Further, the selected volume of gas may be delivered in a single bolus or in two or more boluses.

After the selected volume of gas has been delivered to the chamber (116), the method/system may be configured to wait a selected period of time before again removing gas from the chamber to raise the liquid level in the chamber to the upper liquid level (ULL). In one or more embodiments, the system may, for example, be configured to wait for a period of 10 minutes, 20 minutes, 30 minutes, 1 hour, 1.5 hours, 2 hours, etc. before returning the liquid level to the upper liquid level by removing gas and then delivering a selected volume of gas to lower the liquid level.

Operation of the apparatus as depicted in the flowchart of FIG. 6 in essence involves recalibrating the liquid level in the gas separation device at selected intervals equal to the period of time over which the system waits after removing gas from the chamber to raise the liquid to the upper level, followed by delivering a selected volume of gas into the chamber to lower the liquid level. Such recalibration may be an effective way to control the liquid level within a gas separation device in which the liquid level does not change substantially over short periods of time, while eliminating or reducing the need for additional sensors (such as, e.g., a lower liquid level sensor 60).

The method depicted in FIG. 6 and described herein may be an effective way to control liquid level in a chamber when, for example, a lower liquid level sensor is provided but is not operating properly (or at all).

In one or more alternative embodiments of a level control apparatus that may be used in connection with a gas separation device used in a treatment apparatus as described herein the level control system may operate using only a lower level liquid sensor. One illustrative embodiment of operation of a level control apparatus relying only on a lower level liquid sensor will be described in connection with the lower level sensor 60 depicted and described in connection with the gas separation device 30 seen in FIGS. 1-3 and the flowchart of FIG. 6.

Figure 7:
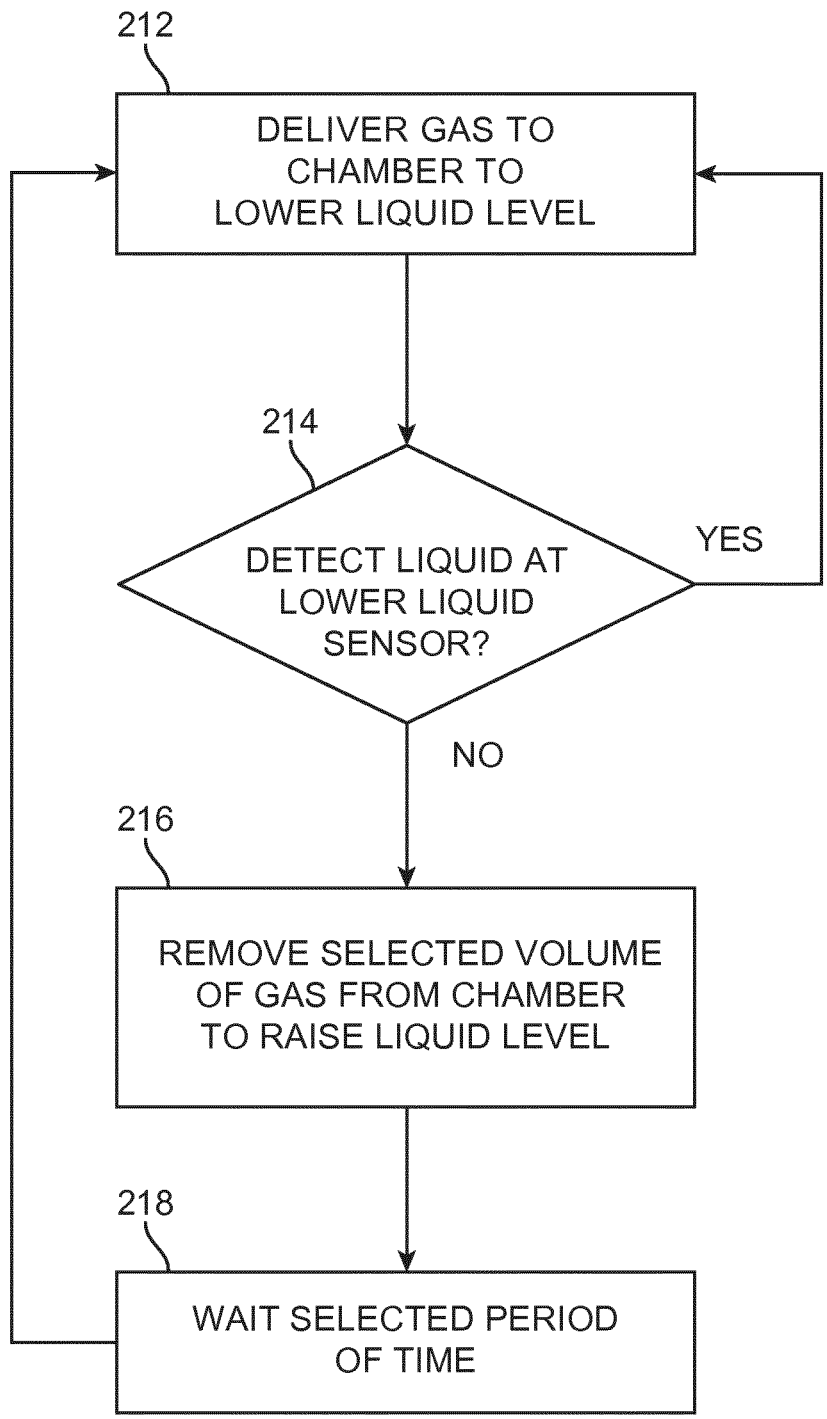
FIG. 7 is a flowchart illustrating operation of another illustrative embodiment of a level control system as described herein.

In a level control apparatus that relies on only a lower level liquid sensor, the control over liquid level within a gas separation device such as, e.g., gas separation device 30 may be controlled as described in the flowchart of FIG. 7. In such a system/method, gas may be delivered into the chamber to lower the level of liquid in the chamber (212) below the lower liquid level (LLL), with the system checking to determine if liquid is detected at the lower liquid level sensor (214).

When liquid is not detected at the lower liquid sensor (214), the level control system may be configured to remove a selected volume of gas from the chamber to raise the level of liquid therein (216). In one or more embodiments, the selected volume of gas removed from the chamber may be selected to move the level of liquid in the chamber to a selected level relative to the lower liquid level (LLL). That selected level may, in one or more embodiments, correspond to or be near the upper liquid level (ULL), but other volumes of gas may also be delivered if the selected level of liquid is not at or near the ULL. Further, the selected volume of gas may be removed in a single bolus or in two or more boluses.

After the selected volume of gas has been removed from the chamber (216), the method/system may be configured to wait a selected period of time before delivering gas to the chamber to reduce the liquid level in the chamber below the lower liquid level (LLL) (218). In one or more embodiments, the system may, for example, be configured to wait for a period of 10 minutes, 20 minutes, 30 minutes, 1 hour, 1.5 hours, 2 hours, etc. before returning the liquid level to the selected liquid level by delivering gas to the chamber to reduce the liquid level below the lower liquid level (LLL) and then removing a selected volume of gas to raise the liquid level to the selected liquid level.

Operation of the apparatus as depicted in the flowchart of FIG. 7 in essence involves recalibrating the liquid level in the gas separation device at selected intervals equal to the period of time over which the system waits after delivering gas into the chamber to lower the liquid to the lower liquid level, followed by removing a selected volume of gas from the chamber to raise the liquid level. Such recalibration may be an effective way to control the liquid level within a gas separation device in which the liquid level does not change substantially over short periods of time, while eliminating or reducing the need for additional sensors (such as, e.g., an upper liquid level sensor 50).

The method depicted in FIG. 7 and described herein may be an effective way to control liquid level in a chamber when, for example, an upper liquid level sensor is provided but is not operating properly (or at all).

As discussed above in connection with the system operation depicted in the flowchart of FIG. 4, detection of foam or liquid by a level control protection sensor 40 (if provided and operating effectively) may, in one or more embodiments, result in disabling of the automated level control system (whether relying on both a lower liquid level sensor and an upper liquid level sensor, relying on only a lower liquid level sensor, or relying only on an upper liquid level sensor) and/or triggering of an alarm for an operator.

Further, as described herein, the level control protection sensor 40 may be used to determine whether one of foam, non-blood liquid, and blood is present or not present at or proximate, for example, the second outlet of the gas separation device 30. In other embodiments, the level control protection sensor 40 may be used at or proximate different locations of the gas separation device 30 and/or on different portions or regions of the extracorporeal blood treatment apparatus (or different treatment apparatus).

Generally, the level control protection sensor 40 may generate a signal that may be used to determine whether one of foam, non-blood liquid, and blood is present or not present. In other words, either air (e.g., absence of foam, non-blood liquid, and blood), foam, non-blood liquid, or blood may be indicated, or determined, using the signal generated by the level control protection sensor. The controller 10 and/or any other processing circuitry (analog and/or digital) may receive and analyze the signal from the level control protection sensor 40, and then based on the received signal, determine whether one of foam, non-blood liquid, and blood is present or not present.

Figure 8:
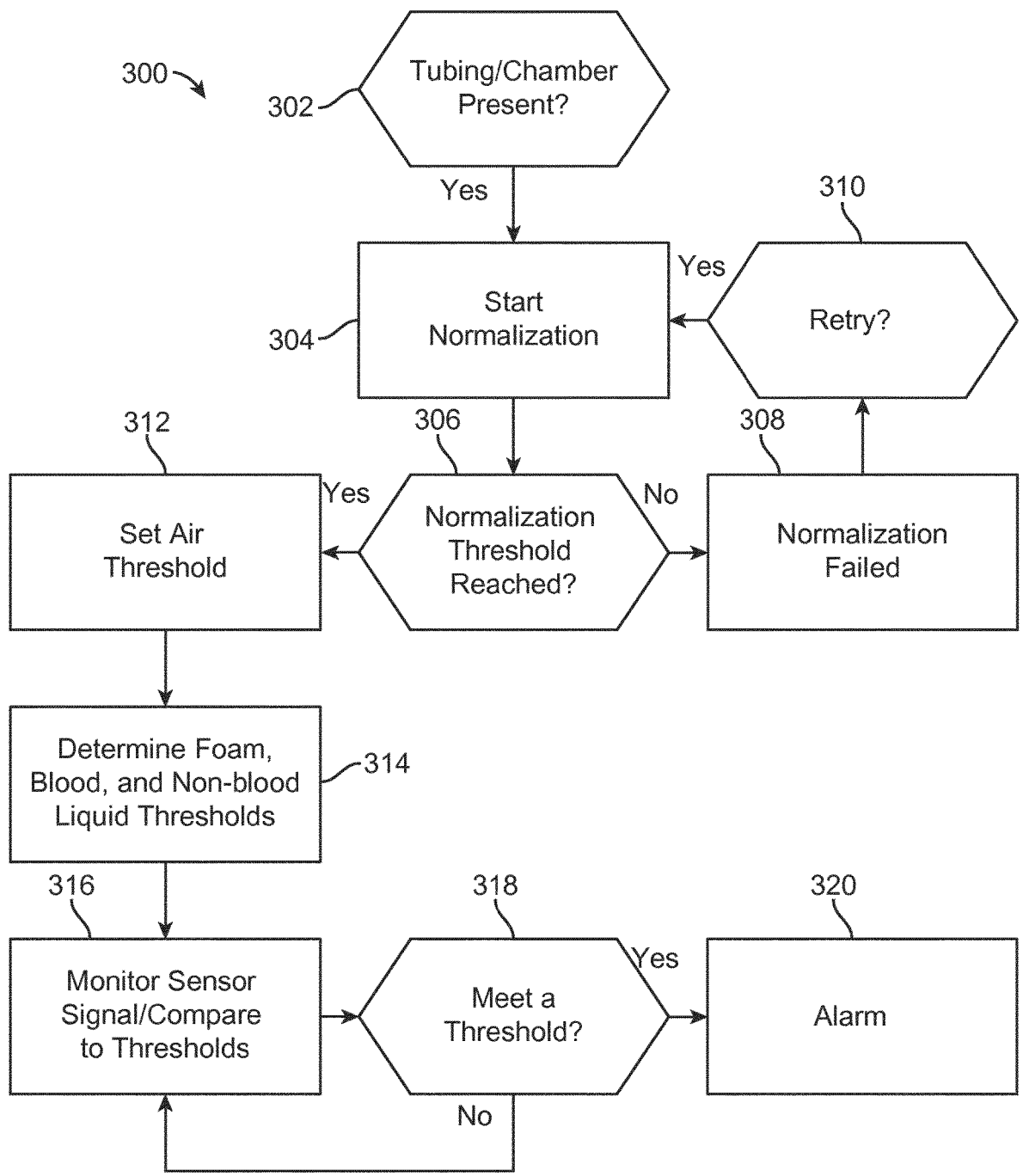
FIG. 8 is a flowchart illustrating exemplary methods of calibration and use of a level control protection sensor.

An exemplary method 300 depicted in FIG. 8 illustrates the functionality of an exemplary level control protection sensor 40. The method 300 may begin with determining whether the tubing/de-gassing chamber is present 302, which may be performed, e.g., using an air pressure detection process and/or any other one or more processes and apparatus. After the tubing/de-gassing chamber is determined to be present 302, the method 300 may start a normalization, or calibration process, 304. The normalization process may be described as being one or more procedures used to normalize, or calibrate, the level control protection sensor 40 such that, e.g., the level control protection sensor 40 may operate in a sufficiently accurate manner to detect foam, blood, non-blood liquid, etc.

In at least one embodiment and as described herein, the level control protection sensor 40 may include an optical energy source 42 and a photo detector 44. To normalize such level control protection sensor 40, one or more parameters of the optical energy directed by the optical energy source 42 may be adjusted until the signal generated by the photo detector 44 reaches a normalization value. For example, the frequency, voltage, and/or pulse width may be adjusted until the photo detector 44 reaches a normalization value.

Figure 9:
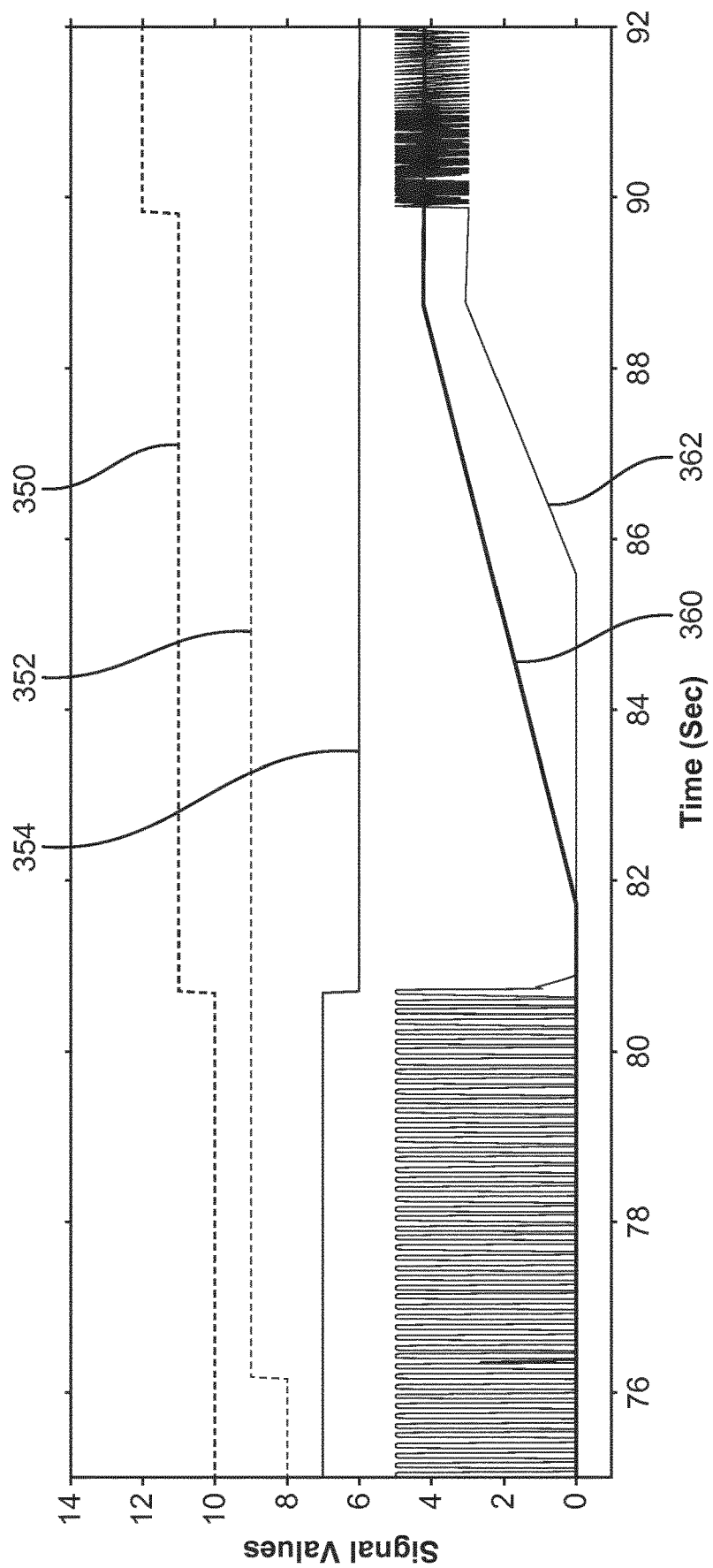
FIG. 9 is a graph illustrating signals used in an exemplary normalization of a level control protection sensor.

A graph illustrating signals used in an exemplary normalization of a level control protection sensor is depicted in FIG. 9. Three control signals are depicted that may be used to indicate the state, or status, of the calibration, or normalization, processes. For example, the normalization status signal 350 may indicate whether the level control protection sensor 40 is not normalized (low signal), in-process of normalization (mid signal), and normalized (high signal). Further, for example, the normalization command signal 352 may indicate whether a normalization command has been received (high signal) or not received (low signal). Still, further, for example, the chamber missing signal 354 may indicate whether tubing/de-gassing chamber is present (low signal) or not present (high signal).

The drive voltage 360 for the optical energy source 42 and the signal voltage 362 (e.g., peak-to-peak voltage) of the receiver, or photo detector, 44 is depicted. As shown in this embodiment, the normalization process does not begin until the chamber missing signal 354 indicates that the tubing/de-gassing chamber is present (low signal) and the normalization command signal 352 indicates that a normalization command has been received (high signal). During this time period, the signal voltage 362 is not normalized.

The drive voltage 360 (e.g., LED Drive Voltage) may be increased when the normalization process begins (e.g., when the chamber missing signal 354 indicates that the tubing/de-gassing chamber is present (low signal) and the normalization command signal 352 indicates that a normalization command has been received (high signal)). The drive voltage 360 may be increased linearly as shown, or in a "step" fashion, until the signal voltage 362 reaches a normalization threshold. In this example, the normalization threshold may be the value 3 (e.g., 3 volts). Once the normalization threshold is met, the drive voltage 360 may be decreased (e.g., 0.6 volts per second rate of decrease) until the signal voltage 362 reaches the normalization threshold, which may be used in circumstances when the drive voltage 360 was increased at such a rate that the signal voltage 362 exceeded the normalization threshold. In other words, the drive voltage 360 may be adjusted (increased, and then decreased, if necessary) until the signal voltage 362 reaches, meets, or "gets close to" the normalization threshold.

Additionally, the normalization process may occur when no fluid (e.g., blood, non-blood liquid such as saline, etc.) is located within the de-gassing chamber. Thus, the normalization process normalizes, or calibrates, the level control protection sensor 40 to detect "air" or no liquid when the signal voltage 362 is proximate the normalization threshold.

As described in this example, the normalization threshold may be about 3 volts. In other embodiments, the normalization threshold may be greater than or less than about 3 volts. Additionally, it is to be understood that the normalization process may change depending on the type of sensors and sensor apparatus used.

If the normalization, or receiver, threshold is not met 306, the method 300 may determine that normalization has failed 308, and then retry 310 the normalization process if warranted. If the normalization, or receiver, threshold is met 306, the method 300 may determine that normalization has been successful, and then proceed to set the air threshold 312 accordingly. The air threshold, which may be used indicate that no fluids or foam is detected, and instead, only air is being detected in the de-gassing chamber may be set to a value proximate the normalization threshold.

Next, each of the foam, blood, and non-blood liquid thresholds may be determined 314 based on the normalization threshold and/or air threshold. In one or more embodiments, each of the foam, blood, and non-blood liquid thresholds may be determined as being a selected percentage of the normalization and/or air threshold. In at least one embodiment, the foam threshold may be about 87.5% of the normalization and/or air threshold, the blood threshold may be about 20% of the normalization and/or air threshold, and the non-blood liquid threshold may be about 112.5% of the normalization and/or air threshold. In one or more embodiments, each of the foam, blood, and non-blood liquid thresholds may be determined as being a certain selected respective offset (e.g., plus a selected value or minus a selected value) of the normalization and/or air threshold.

In other words, the normalization, or calibration, processes may be described as starting in an idle state and waiting for a normalization command from therapy code, which is sent after a set is reported as loaded. The process, or algorithm, may then wait to confirm that the de-gassing chamber is present to prevent normalizing in the event the set is loaded before the chamber is inserted. Normalization may then begin by setting the LED drive voltage to zero volts and disabling one or more foam detection processes. The process, or algorithm, may then quickly raise the drive voltage while monitoring the receiver voltage. If the drive voltage reaches the maximum, then normalization fails and the normalization status is updated to indicate the failure and alarm is raised. If the receiver voltage becomes greater than 3.0 V, then algorithm slowly lowers the drive voltage back to 3.0 volts. Once the voltage reads 3.0 V and 10 voltage samples are taken, the normalized value is calculated by taking the average of the samples. The blood, foam, and non-blood liquid thresholds are calculated based on the calculated normalized voltage. Once normalization is complete, the normalization status may be updated to either pass or fail. This status is sent to therapy to indicate if normalization was successful. If normalization failed, therapy may raise an alarm and auto liquid leveling may be disabled. Furthermore, the foam detector can be re-normalized if requested.

The exemplary method 300 may then monitor the sensor voltage and compare the sensor voltage to the threshold values 316 for determination of whether or not blood, foam, and non-blood liquid is present. More specifically, if one of the thresholds is met 318, indicating that one of blood, foam, and non-blood liquid is present, the method 300 may proceed to alarm 320 (e.g., indicate to the system that foam, blood, or non-blood liquid is detected, etc.). If none of the thresholds are met 318, then the method 300 may be continue looping and monitoring the signal voltage 362 during and until the completion of an extracorporeal blood treatment.

Figure 10:
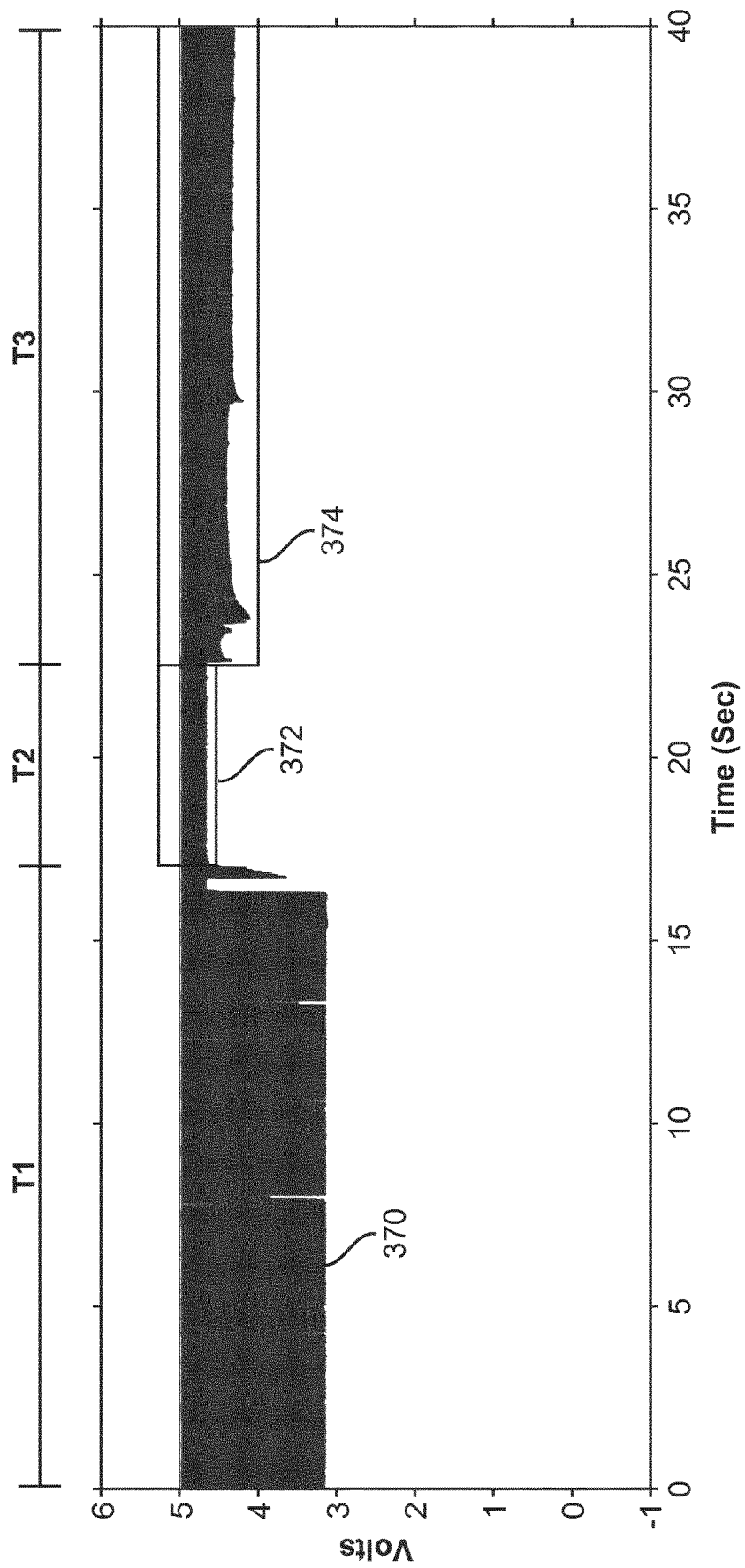
FIG. 10 is a graph illustrating a signal from a level control protection sensor over time.
Figure 11:
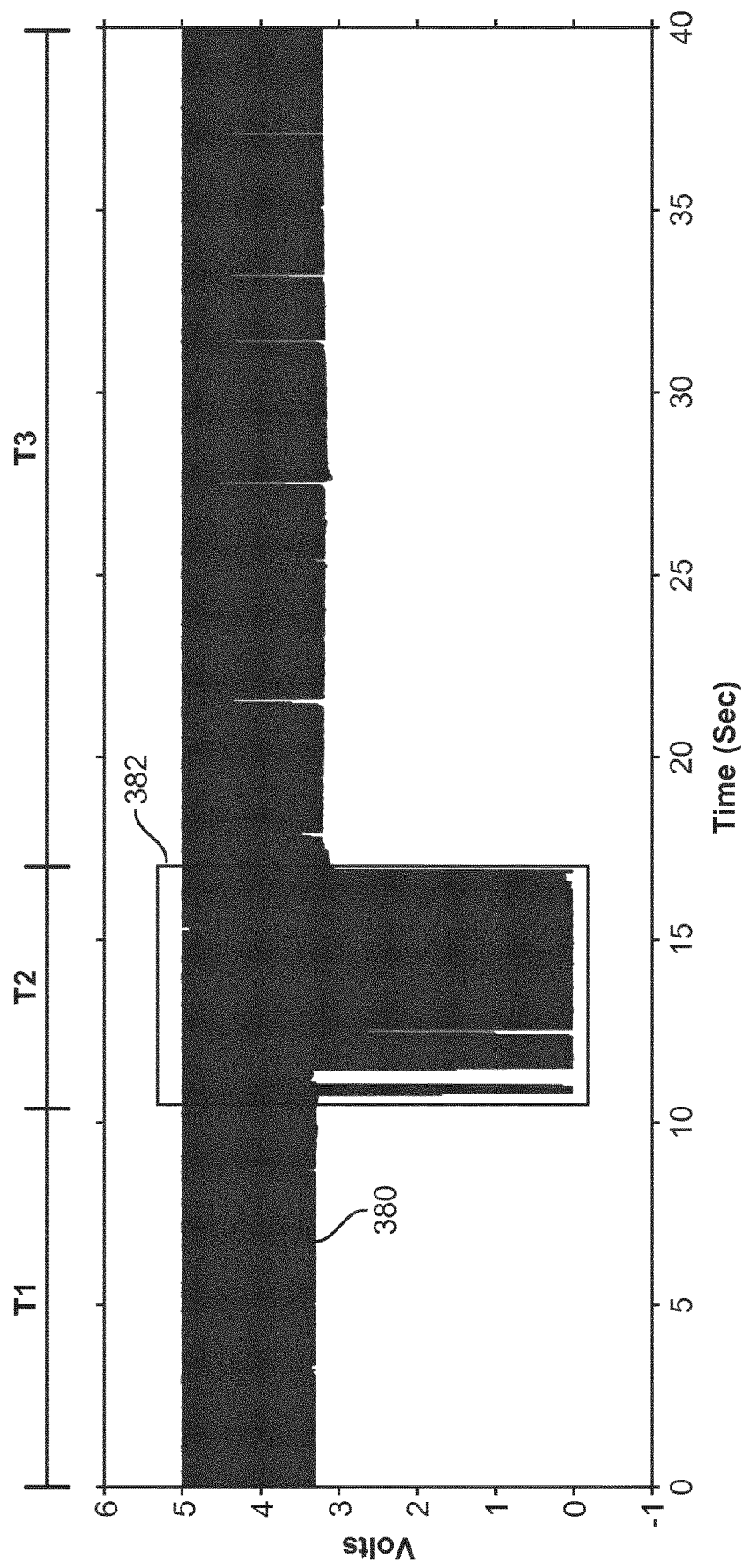
FIG. 11 is another graph illustrating a signal from a level control protection sensor over time.

Two graphs illustrating signals 370, 380 from a level control protection sensor 40 over time are depicted in FIGS. 10-11. As shown in FIG. 10, the signal 370 is roughly 1.8 volts peak-to-peak in time period T1, which is proximate, or close to, the normalization threshold value in this example, thereby indicating that no blood, foam, or non-blood liquid is present. In time period T2 (see box 372), the peak-to-peak voltage drops to about 0.25 volts which is lower than both the blood threshold and the foam threshold thereby indicating that blood is present. In time period T3 (see box 374), the peak-to-peak voltage is about 0.5 volts which is lower than the foam threshold but higher than the blood threshold thereby indicating that foam is present.

As shown in FIG. 11, the signal 370 is roughly 1.8 volts peak-to-peak in time period T1, which is proximate, or close to, the normalization threshold value in this example, thereby indicating that no blood, foam, or non-blood liquid is present. In time period T2 (see box 382), the peak-to-peak voltage increases to about 5 volts which is higher than the non-blood liquid threshold thereby indicating that non-blood liquid is present. In time period T3, the peak-to-peak voltage returns to about 1.8 volts thereby indicating that no blood, foam, or non-blood liquid is present.

Additionally, it is to be understood that each of the signals described herein such as the signal output from the photo detector 44 of the level control protection sensor 40 may undergo one or more signal processing methods and/or processes. For example, various averaging and noise reductions methods or processes may be performed. In at least one embodiment, a moving average may be applied to the signal in order to filter out 5V reading (inverse 0V), and a value of 10 samples over a 30-sample window may be used due the sampling frequency is 60 Hz. 30 samples correspond to 0.5 s, which may be the same detect time for foam. Additionally, 10 samples may be used because of the difference in the square wave frequency (1.1 kHz) and the sample frequency of 60 Hz. Since the driving wave is square, most samples may be either 5V or the measured peak voltage with a few samples falling somewhere on the falling or rising edge. 10 samples may be described as allowing enough room to account for rising/falling samples while still confirming that fluid is present.

In other words, described herein are one or more processes, or algorithms, to tune an infrared transmit/receive pair to be able to detect the presence and difference between fluids in the sensor path. The processes, or algorithms, can determine the difference between air, clear fluids (saline, replacement fluid), blood, and foam occluding the sensor beam. This allows for additional automatic reaction options over an occluded/not occluded approach. The additional reactions may include unique alarm scenarios, fluid specific instructions for occlusion removal, and automatic occlusion removal based on fluid type.

The processes, or algorithms, may use readings from an infrared (IR) transmit/receiver pair configured so that fluid passes between them. The processes wait to confirm that a chamber is present before starting a normalization sequence. The normalization sequence may set the transmitter drive strength to a value that is strong enough to be seen by the receiver through ambient IR conditions as well as cancel out any chamber to chamber variations. The transmit drive voltage may be set to zero volts, and then slowly increased until the receiver reaches a desired threshold. The receiver voltage may then be averaged over a number of samples and the average is set as the normalized receiver value. This normalized value may correspond to the voltage reading for air (e.g., absence of blood, foam, and non-blood liquid).

Multiple thresholds may then be set based on the normalized receiver value. These are the thresholds for foam detection, saline detection, and blood detection. These thresholds were determined based on experimental data. These thresholds may then be used for alarm processing and automatic system response.

It is to be understood that this could be possible using different sensor technology such as a capacitive sensor to distinguish between fluids based on their dielectric constants. Further, more fluids could potentially be detected if their refraction properties were different enough from the fluids described above (for example, fluids with different medication concentrations) so that different amounts of IR light reach the receiver.

ILLUSTRATIVE EMBODIMENTS

Illustrative embodiments of the apparatus and systems described herein may include the following embodiments:

Embodiment 1. A liquid treatment apparatus comprising:
  a pump located on a housing, the pump configured to move liquid during extracorporeal blood treatment;
  a gas separation device positioned on the housing, wherein the pump is configured to deliver liquid to the gas separation device, and wherein the gas separation device comprises:
    a containing body defining an internal volume,
    a first outlet in fluid communication with the internal volume, wherein the first outlet is located proximate a bottom of the containing body,
    a first inlet in fluid communication with the internal volume, the first inlet located above and spaced apart from the first inlet,
    a second outlet in fluid communication with the internal volume, wherein the first inlet is located between the first outlet and the second outlet;
  an upper liquid level sensor configured and positioned to detect liquid at a selected upper liquid level in the internal volume;
  a level control apparatus in fluid communication with the internal volume of the gas separation device, the level control apparatus configured to deliver gas to or remove gas from the internal volume through an opening located above the first inlet;
  a controller operably connected to the upper liquid level sensor and the level control apparatus, the controller configured to:
    receive signals from the upper liquid level sensor indicating that liquid is present or not present at the upper liquid level in the internal volume,
    activate the level control apparatus to remove gas from the internal volume to raise the liquid level to the upper liquid level,
    activate the level control apparatus to deliver a selected volume of gas into the internal volume when the signals from the upper liquid level sensor indicate that liquid is present at the upper liquid level, and
    wait a selected period of time after delivering the selected volume of gas into the internal volume before activating the level control apparatus to remove gas from the internal volume to raise the liquid level to the upper liquid level.

Embodiment 2. An apparatus according to embodiment 1, wherein the apparatus further comprises a level control protection sensor configured to detect foam and/or liquid leaving the internal volume through the second outlet, wherein the controller is operably connected to the level control protection sensor, the controller further configured to receive signals from the level control protection sensor indicating that foam and/or liquid is present in the second outlet of the degassing device and disable the level control apparatus when the signals from the level control protection sensor indicate that foam and/or liquid is present in the second outlet.

Embodiment 3. An apparatus according to embodiment 2, wherein the level control protection sensor comprises an optical sensor and the upper liquid level sensor is selected from the group of an ultrasonic liquid sensor and a capacitive liquid sensor.

Embodiment 4. An apparatus according to embodiment 3, wherein the optical sensor comprises an optical energy source positioned to direct optical energy at a photodetector.

Embodiment 5. An apparatus according to embodiment 4, wherein the controller is configured to pulse the optical energy source.

Embodiment 6. An apparatus according to any one of embodiments 4 to 5, wherein the optical energy source is positioned to direct the optical energy through the second outlet towards the photodetector.

Embodiment 7. An apparatus according to any one of embodiments 3 to 6, wherein the optical energy source emits optical energy in the IR spectrum and wherein the photodetector is configured to detect optical energy in the IR spectrum.

Embodiment 8. An apparatus according to any one of embodiments 1 to 7, wherein the upper liquid level sensor comprises an ultrasonic liquid sensor configured to direct ultrasonic energy into the internal volume of the gas separation device.

Embodiment 9. A liquid treatment apparatus comprising:
  a pump located on a housing, wherein pump is configured to move liquid, optionally blood or another physiological liquid during extracorporeal blood treatment;
  a gas separation device positioned on the housing, wherein the pump is configured to deliver liquid to the gas separation device, and wherein the gas separation device comprises:
    a containing body defining an internal volume,
    a first outlet in fluid communication with the internal volume, wherein the first outlet is located proximate a bottom of the containing body,
    a first inlet in fluid communication with the internal volume, the first inlet located above and spaced apart from the first inlet,
    a second outlet in fluid communication with the internal volume, wherein the first inlet is located between the first outlet and the second outlet;
  a lower liquid level sensor configured and positioned to detect liquid at a selected lower liquid level in the internal volume;
  a level control apparatus in fluid communication with the internal volume of the gas separation device, the level control apparatus configured to deliver gas to or remove gas from the internal volume through an opening located above the first inlet;
  a controller operably connected to the lower liquid level sensor and the level control apparatus, the controller configured to:
    receive signals from the lower liquid level sensor indicating that liquid is present or not present at the lower liquid level in the internal volume, activate the level control apparatus to deliver gas to the internal volume to lower the liquid level below the lower liquid level, activate the level control apparatus to remove a selected volume of gas from the internal volume when the signals from the lower liquid level sensor indicate that liquid is not present at the lower liquid level, and wait a selected period of time after removing the selected volume of gas from the internal volume before activating the level control apparatus to deliver gas to the internal volume to lower the liquid level below the lower liquid level.

Embodiment 10. An apparatus according to embodiment 9, wherein the apparatus further comprises a level control protection sensor configured to detect foam and/or liquid leaving the internal volume through the second outlet, wherein the controller is operably connected to the level control protection sensor, the controller further configured to receive signals from the level control protection sensor indicating that foam and/or liquid is present or not present in the second outlet of the degassing device and disable the level control apparatus when the signals from the level control protection sensor indicate that foam and/or liquid is present in the second outlet.

Embodiment 11. An apparatus according to embodiment 10, wherein the level control protection sensor comprises an optical sensor and the lower liquid level sensor is selected from the group of an ultrasonic liquid sensor and a capacitive liquid sensor.

Embodiment 12. An apparatus according to embodiment 11, wherein the optical sensor comprises an optical energy source positioned to direct optical energy at a photodetector.

Embodiment 13. An apparatus according to embodiment 12, wherein the controller is configured to pulse the optical energy source.

Embodiment 14. An apparatus according to any one of embodiments 12 to 13, wherein the optical energy source is positioned to direct the optical energy through the second outlet towards the photodetector.

Embodiment 15. An apparatus according to any one of embodiments 12 to 14, wherein the optical energy source emits optical energy in the IR spectrum and wherein the photodetector is configured to detect optical energy in the IR spectrum.

Embodiment 16. An apparatus according to any one of embodiments 9 to 15, wherein the lower liquid level sensor comprises an ultrasonic liquid sensor configured to direct ultrasonic energy into the internal volume of the gas separation device.

Embodiment 17. A liquid treatment apparatus comprising:
a pump located on a housing, wherein the pump is configured to move liquid, optionally blood or another physiological liquid during extracorporeal blood treatment;
a gas separation device positioned on the exterior of the housing, wherein the pump is configured to deliver liquid to the gas separation device, and wherein the gas separation device comprises:
a containing body defining an internal volume,
a first outlet in fluid communication with the internal volume, wherein the first outlet is located proximate a bottom of the containing body,
a first inlet in fluid communication with the internal volume, the first inlet located above and spaced apart from the first inlet,
a second outlet in fluid communication with the internal volume, wherein the first inlet is located between the first outlet and the second outlet;
a lower liquid level sensor configured and positioned to detect liquid at a selected lower liquid level in the internal volume;
a level control protection sensor configured to detect foam and/or liquid leaving the internal volume through the second outlet;
an upper liquid level sensor configured and positioned to detect liquid at a selected upper liquid level in the internal volume, wherein the upper liquid level sensor is positioned between the lower liquid level sensor and the level control protection sensor when moving from the first outlet to the second outlet through the internal volume;
a level control apparatus in fluid communication with the internal volume of the gas separation device, the level control apparatus configured to deliver gas to or remove gas from the internal volume through an opening located above the first inlet;
a controller operably connected to the lower liquid level sensor, the level control protection sensor, the upper liquid level sensor, and the level control apparatus, the controller configured to:
receive signals from the lower liquid level sensor indicating that liquid is present or not present at the lower liquid level in the internal volume,
receive signals from the upper liquid level sensor indicating that liquid is present or not present at the upper liquid level in the internal volume,
receive signals from the level control protection sensor indicating that foam and/or liquid is present or not present in the second outlet of the degassing device, and
activate the level control apparatus to remove gas from the internal volume when the signals from the lower liquid level sensor indicate that liquid is not present at the lower liquid level and the signals from the level control protection sensor indicate that foam and/or liquid is not present in the second outlet.

Embodiment 18. An apparatus according to embodiment 17, wherein the controller is further configured to disable the level control apparatus when the signals from the level control protection sensor indicate that foam and/or liquid is present in the second outlet.

Embodiment 19. An apparatus according to any one of embodiments 17 to 18, wherein the level control protection sensor comprises an optical sensor and wherein the lower liquid level sensor is selected from the group of an ultrasonic liquid sensor and a capacitive liquid sensor.

Embodiment 20. An apparatus according to any one of embodiments 17 to 18, wherein the level control protection sensor comprises an optical sensor and wherein the lower liquid level sensor comprises an ultrasonic liquid sensor configured to direct ultrasonic energy into the internal volume of the gas separation device.

Embodiment 21. An apparatus according to any one of embodiments 17 to 20, wherein the upper liquid level sensor is selected from the group of an ultrasonic liquid sensor and a capacitive liquid sensor.

Embodiment 22. An apparatus according to any one of embodiments 17 to 20, wherein the upper liquid level sensor comprises an ultrasonic liquid sensor configured to direct ultrasonic energy into the internal volume of the gas separation device.

Embodiment 23. An apparatus according to any one of embodiments 17 to 22, wherein the controller is configured to activate the level control apparatus to deliver gas to the internal volume when the signals from the upper liquid level sensor indicate that liquid is present at the upper liquid level.

Embodiment 24. An apparatus according to any one of embodiments 19 to 23, wherein the optical sensor comprises an optical energy source positioned to direct optical energy at a photodetector.

Embodiment 25. An apparatus according to embodiment 24, wherein the controller is configured to pulse the optical energy source.

Embodiment 26. An apparatus according to any one of embodiments 24 to 25, wherein the optical energy source is positioned to direct the optical energy through the second outlet towards the photodetector.

Embodiment 27. An apparatus according to any one of embodiments 24 to 26, wherein the optical energy source emits optical energy in the IR spectrum and wherein the photodetector is configured to detect optical energy in the IR spectrum.

Embodiment 28. An apparatus according to any one of embodiments 17 to 27, wherein the apparatus comprises:
  a guide element located within the internal volume of the containing body, an intermediate portion of the guide element configured to contact fluid entering the internal volume through the first inlet, wherein the guide element extends between a top end and a bottom end, wherein the top end is located distal from the first outlet and the bottom end is located distal from the second outlet;
  wherein the lower liquid level sensor comprises a lower level detection axis passing through the internal volume between the guide element and in inner surface of the containing body, wherein the lower level detection axis does not pass through the guide element.

Embodiment 29. An apparatus according to embodiment 28, wherein the detection axis passes between guide element and the exterior of the housing.

Embodiment 30. An apparatus according to any one of embodiments 28 to 29, wherein the lower liquid level sensor comprises an emitter and a receiver, wherein the emitter and the receiver are spaced apart from each other along the lower level detection axis.

Embodiment 31. A liquid treatment apparatus comprising:
  a pump located on a housing, wherein the pump is configured to move liquid, optionally blood or another physiological liquid during extracorporeal blood treatment;
  a gas separation device positioned on the exterior of the housing, wherein the pump is configured to deliver liquid to the gas separation device, and wherein the gas separation device comprises:
    a containing body defining an internal volume,
    a first outlet in fluid communication with the internal volume, wherein the first outlet is located proximate a bottom of the containing body,
    a first inlet in fluid communication with the internal volume, the first inlet located above and spaced apart from the first inlet,
    a second outlet in fluid communication with the internal volume, wherein the first inlet is located between the first outlet and the second outlet, and
    a guide element located within the internal volume of the containing body, an intermediate portion of the guide element configured to contact fluid entering the internal volume through the first inlet, wherein the guide element extends between a top end and a bottom end, wherein the top end is located distal from the first outlet and the bottom end is located distal from the second outlet;
    and
  a lower liquid level sensor positioned to detect liquid at a selected lower level in the internal volume, the lower level sensor comprising a lower level detection axis passing through the internal volume between the guide element and the containing body, wherein the lower level detection axis does not pass through the guide element.

Embodiment 32. An apparatus according to embodiment 31, wherein the detection axis passes between guide element and the exterior of the housing.

Embodiment 33. An apparatus according to any one of embodiments 31 to 32, wherein the lower liquid level sensor comprises an emitter and a receiver, wherein the emitter and the receiver are spaced apart from each other along the lower level detection axis.

Embodiment 34. An apparatus according to any one of embodiments 31 to 33, wherein the apparatus further comprises:
  a level control protection sensor configured to detect foam and/or liquid leaving the internal volume through the second outlet;
  an upper liquid level sensor configured and positioned to detect liquid at a selected upper liquid level in the internal volume, wherein the upper liquid level sensor is positioned between the lower liquid level sensor and the level control protection sensor when moving from the first outlet to the second outlet through the internal volume;
  a level control apparatus in fluid communication with the internal volume of the gas separation device, the level control apparatus configured to deliver gas to or remove gas from the internal volume through an opening located above the first inlet;
  a controller operably connected to the lower liquid level sensor, the level control protection sensor, the upper liquid level sensor, the controller configured to:
    receive signals from the lower liquid level sensor indicating that liquid is present or not present at the lower liquid level in the internal volume,
    receive signals from the upper liquid level sensor indicating that liquid is present or not present at the upper liquid level in the internal volume,
    receive signals from the level control protection sensor indicating that foam and/or liquid is present or not present in the second outlet of the degassing device,
    disable the level control apparatus when the signals from the level control protection sensor indicate that foam and/or liquid is present in the second outlet.

Embodiment 35. An apparatus according to embodiment 34, wherein the level control protection sensor comprises an optical sensor and wherein the lower liquid level sensor is selected from the group of an ultrasonic liquid sensor and a capacitive liquid sensor.

Embodiment 36. An apparatus according to embodiment 34, wherein the level control protection sensor comprises an optical sensor and wherein the lower liquid level sensor comprises an ultrasonic liquid sensor configured to direct ultrasonic energy into the internal volume of the gas separation device.

Embodiment 37. An apparatus according to any one of embodiments 34 to 36, wherein the upper liquid level sensor is selected from the group of an ultrasonic liquid sensor and a capacitive liquid sensor.

Embodiment 38. An apparatus according to any one of embodiments 34 to 36, wherein the upper liquid level sensor comprises an ultrasonic liquid sensor configured to direct ultrasonic energy into the internal volume of the gas separation device.

Embodiment 39. An apparatus according to any one of embodiments 34 to 38, wherein the optical sensor comprises an optical energy source positioned to direct optical energy at a photodetector.

Embodiment 40. An apparatus according to embodiment 39, wherein the controller is configured to pulse the optical energy source.

Embodiment 41. An apparatus according to any one of embodiments 39 to 40, wherein the optical energy source is positioned to direct the optical energy through the second outlet towards the photodetector.

Embodiment 42. An apparatus according to any one of embodiments 39 to 41, wherein the optical energy source emits optical energy in the IR spectrum and wherein the photodetector is configured to detect optical energy in the IR spectrum.

Embodiment 43. A method of controlling liquid level in a gas separation device of a liquid treatment apparatus of any one of embodiments 1 to 42.

Embodiment 44. A liquid treatment apparatus comprising:
a pump configured to move liquid, optionally blood or another physiological liquid, during extracorporeal blood treatment;
a gas separation device, wherein the pump is configured to deliver liquid to the gas separation device, the gas separation device comprising:
a containing body defining an internal volume,
a first outlet in fluid communication with the internal volume, wherein the first outlet is located proximate a bottom of the containing body,
a first inlet in fluid communication with the internal volume, the first inlet located above and spaced apart from the first inlet, and
a second outlet in fluid communication with the internal volume, wherein the first inlet is located between the first outlet and the second outlet;
a level control protection sensor to detect one or more of foam, non-blood liquid, and blood leaving the internal volume through the second outlet; and
a controller operably connected to the level control protection sensor and configured to:
receive a signal from the level control protection sensor; and
determine whether one of foam, non-blood liquid, and blood is present or not present in the second outlet of the gas separation device based on the received signal from the level control protection sensor.

Embodiment 45. A sensor system comprising:
a level control protection sensor to detect one or more of foam, non-blood liquid, and blood with an internal volume; and
a controller operably connected to the level control protection sensor and configured to:
receive a signal from the level control protection sensor; and
determine whether one of foam, non-blood liquid, and blood is present or not present in the internal volume based on the received signal from the level control protection sensor.

Embodiment 46. The apparatus or system as in any one of embodiments 44-45, wherein controller is further configured to normalize the level control protection sensor when foam, non-blood liquid, and blood are not present in the internal volume.

Embodiment 47. The apparatus or system as in any one of embodiments 44-46, wherein the level control protection sensor comprises:
a photodetector to provide the signal of the level control protection sensor; and
an optical energy source positioned to direct optical energy at the photodetector.

Embodiment 48. The apparatus or system of embodiment 47, wherein the optical energy source emits optical energy in the IR spectrum and the photodetector detects optical energy in the IR spectrum.

Embodiment 49. The apparatus or system as in any one of embodiments 46-48, wherein normalizing the level control protection sensor when foam, non-blood liquid, and blood are not present in the internal volume comprises adjusting one or more parameters of the optical energy directed by the optical energy source until the signal reaches a normalization value.

Embodiment 50. The apparatus or system as in any one of embodiments 44-49, wherein determining whether one of foam, non-blood liquid, and blood is present or not present in the internal volume based on the received signal from the level control protection sensor comprises:
determining that foam is present if the received signal is less than or equal to a foam threshold value and greater than a blood threshold value.

Embodiment 51. The apparatus or system as in any one of embodiments 44-50, wherein determining whether one of foam, non-blood liquid, and blood is present or not present in the internal volume based on the received signal from the level control protection sensor comprises:
determining that non-blood liquid is present if the received signal is greater than or equal to a non-blood liquid threshold value.

Embodiment 52. The apparatus or system as in any one of embodiments 44-51, wherein determining whether one of foam, non-blood liquid, and blood is present or not present in the internal volume based on the received signal from the level control protection sensor comprises:
determining that blood is present if the received signal is less than or equal to a blood threshold value.

Embodiment 53. The apparatus or system as in any one of embodiments 44-52, wherein determining whether one of foam, non-blood liquid, and blood is present or not present in the internal volume based on the received signal from the level control protection sensor comprises:
determining that none of non-blood liquid, and blood is present if the received signal is greater than or equal to a foam threshold value and less than a non-blood liquid threshold value.

Embodiment 54. The apparatus or system as in any one of embodiments 50-53, wherein the foam threshold value, the non-blood liquid threshold value, and the blood threshold value are each a different selected percentage of the normalization threshold value.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the treatment apparatus including gas separation device with level controls and methods of using the same are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

Elected for Publication: FIG. 2

What is claimed is:

1. A liquid treatment apparatus comprising:
   a pump configured to move liquid, optionally blood or another physiological liquid, during extracorporeal blood treatment;
   a gas separation device, wherein the pump is configured to deliver liquid to the gas separation device, the gas separation device comprising:
      a containing body defining an internal volume,
      a first outlet in fluid communication with the internal volume, wherein the first outlet is located proximate a bottom of the containing body,
      a first inlet in fluid communication with the internal volume, the first inlet located above and spaced apart from the first outlet, and
      a second outlet in fluid communication with the internal volume, wherein the first inlet is located between the first outlet and the second outlet;
   a level control protection sensor to detect foam leaving the internal volume through the second outlet; and
   a level control apparatus in fluid communication with the internal volume of the gas separation device, the level control apparatus configured to deliver gas to the internal volume through an opening located above the first inlet to lower a liquid level in the internal volume of the gas separation device and remove gas from the internal volume through the opening to raise the liquid level in the internal volume of the gas separation device;
   a controller operably connected to the level control protection sensor and the level control apparatus, the controller configured to:
      receive a signal from the level control protection sensor;
      determine whether foam is present in a selected volume of the second outlet of the gas separation device based on the received signal from the level control protection sensor; and
      disable the level control apparatus when the controller determines that foam is present in the selected volume of the second outlet of the gas separation device based on the received signal from the level control protection sensor.

2. The apparatus of claim 1, wherein the controller is further configured to normalize the level control protection sensor by determining a normalization value when foam, non-blood liquid, and blood are not present in the second outlet.

3. The apparatus of claim 2, wherein normalizing the level control protection sensor when foam, non-blood liquid, and blood are not present in the internal volume comprises adjusting one or more parameters of the level control protection sensor until the signal reaches the normalization value.

4. The apparatus of claim 2, wherein the foam threshold value and the non-blood liquid threshold value are each a different selected percentage of the normalization value.

5. The apparatus of claim 1, wherein the level control protection sensor comprises:
   a photodetector configured to provide the signal of the level control protection sensor; and
   an optical energy source positioned and configured to direct optical energy at the photodetector.

6. The apparatus of claim 5, wherein the optical energy source emits optical energy in the IR spectrum and the photodetector detects optical energy in the IR spectrum.

7. The apparatus of claim 1, wherein determining whether foam is present in the selected volume based on the received signal from the level control protection sensor comprises:
   determining that foam is present if the received signal is less than or equal to a foam threshold value and greater than a blood threshold value.

8. The apparatus of claim 1, wherein determining whether foam is present in the selected volume based on the received signal from the level control protection sensor comprises:
   determining that none of non-blood liquid and blood is present if the received signal is greater than or equal to a foam threshold value and less than a non-blood liquid threshold value.

9. The apparatus of claim 1, wherein the apparatus comprises:
   an upper liquid level sensor configured and positioned to detect liquid at a selected upper liquid level in the internal volume;
   wherein the controller is operably connected to the upper liquid level sensor, the controller configured to:
      receive signals from the upper liquid level sensor indicating that liquid is present or not present at the upper liquid level in the internal volume,
      activate the level control apparatus to remove gas from the internal volume to raise the liquid level to the upper liquid level,
      activate the level control apparatus to deliver a selected volume of gas into the internal volume when the signals from the upper liquid level sensor indicate that liquid is present at the upper liquid level, and
      wait a selected period of time after delivering the selected volume of gas into the internal volume before activating the level control apparatus to remove gas from the internal volume to raise the liquid level to the upper liquid level.

10. The apparatus of claim 1, wherein the upper liquid level sensor is selected from the group of an ultrasonic liquid sensor and a capacitive liquid sensor.

11. The apparatus of claim 1, wherein the apparatus further comprises:
  a lower liquid level sensor configured and positioned to detect liquid at a selected lower liquid level in the internal volume;
  wherein the controller is operably connected to the lower liquid level sensor, the controller configured to:
    receive signals from the lower liquid level sensor indicating that liquid is present or not present at the lower liquid level in the internal volume,
    activate the level control apparatus to deliver gas to the internal volume to lower the liquid level below the lower liquid level,
    activate the level control apparatus to remove a selected volume of gas from the internal volume when the signals from the lower liquid level sensor indicate that liquid is not present at the lower liquid level, and
    wait a selected period of time after removing the selected volume of gas from the internal volume before activating the level control apparatus to deliver gas to the internal volume to lower the liquid level below the lower liquid level.

12. The apparatus of claim 11, wherein the lower liquid level sensor is selected from the group of an ultrasonic liquid sensor and a capacitive liquid sensor.

13. A liquid treatment apparatus comprising:
  a pump configured to move liquid, optionally blood or another physiological liquid, during extracorporeal blood treatment;
  a gas separation device, wherein the pump is configured to deliver liquid to the gas separation device, the gas separation device comprising:
    a containing body defining an internal volume,
    a first outlet in fluid communication with the internal volume, wherein the first outlet is located proximate a bottom of the containing body,
    a first inlet in fluid communication with the internal volume, the first inlet located above and spaced apart from the first outlet, and
    a second outlet in fluid communication with the internal volume, wherein the first inlet is located between the first outlet and the second outlet;
  a level control protection sensor configured to detect one or more of foam, non-blood liquid, and blood leaving the internal volume through the second outlet;
  a level control apparatus in fluid communication with the internal volume of the gas separation device, the level control apparatus configured to deliver gas to the internal volume through an opening located above the first inlet to lower a liquid level in the internal volume of the gas separation device and remove gas from the internal volume through the opening to raise the liquid level in the internal volume of the gas separation device; and
  a controller operably connected to the level control protection sensor and the level control apparatus, the controller configured to:
    receive a signal from the level control protection sensor,
    normalize the level control protection sensor by determining a normalization value of the signal when foam, non-blood liquid, and blood are not present in the second outlet, and
    determine that foam is present in a selected volume of the second outlet of the gas separation device if the received signal is less than or equal to a foam threshold value and greater than a blood threshold value, and
    disable the level control apparatus when the controller determines that foam is present in the selected volume of the second outlet of the gas separation device based on the received signal from the level control protection sensor.

14. The apparatus of claim 13, wherein the controller is configured to determine that non-blood liquid is present if the received signal is greater than or equal to a non-blood liquid threshold value.

15. The apparatus of claim 13, wherein the controller is configured to:
  determine that non-blood liquid is present if the received signal is greater than or equal to a non-blood liquid threshold value; and
  determine that blood is present if the received signal is less than or equal to a blood threshold value.

16. The apparatus of claim 13, wherein the foam threshold value, the non-blood liquid threshold value, and the blood threshold value are each a different selected percentage of the normalization value.

17. The apparatus of claim 13, wherein the apparatus comprises:
  an upper liquid level sensor configured and positioned to detect liquid at a selected upper liquid level in the internal volume;
  wherein the controller is operably connected to the upper liquid level sensor, the controller configured to:
    receive signals from the upper liquid level sensor indicating that liquid is present or not present at the upper liquid level in the internal volume,
    activate the level control apparatus to remove gas from the internal volume to raise the liquid level to the upper liquid level,
    activate the level control apparatus to deliver a selected volume of gas into the internal volume when the signals from the upper liquid level sensor indicate that liquid is present at the upper liquid level, and
    wait a selected period of time after delivering the selected volume of gas into the internal volume before activating the level control apparatus to remove gas from the internal volume to raise the liquid level to the upper liquid level.

18. The apparatus of claim 13, wherein the apparatus further comprises:
  a lower liquid level sensor configured and positioned to detect liquid at a selected lower liquid level in the internal volume;
  wherein the controller is operably connected to the lower liquid level sensor, the controller configured to:
    receive signals from the lower liquid level sensor indicating that liquid is present or not present at the lower liquid level in the internal volume,
    activate the level control apparatus to deliver gas to the internal volume to lower the liquid level below the lower liquid level,
    activate the level control apparatus to remove a selected volume of gas from the internal volume when the signals from the lower liquid level sensor indicate that liquid is not present at the lower liquid level, and
    wait a selected period of time after removing the selected volume of gas from the internal volume before activating the level control apparatus to deliver gas to the internal volume to lower the liquid level below the lower liquid level.

\* \* \* \* \*